(12) United States Patent
Gutierrez Lopez et al.

(10) Patent No.: US 9,404,820 B2
(45) Date of Patent: Aug. 2, 2016

(54) METHOD AND SYSTEM FOR ESTIMATING THE FORCES AND TORQUES GENERATED BY THE CONTACT OF A TIRE WITH THE ROAD IN AN INSTRUMENTED WHEEL

(75) Inventors: Maria Dolores Gutierrez Lopez, Madrid (ES); Javier Garcia De Jalon De La Fuente, Madrid (ES)

(73) Assignee: UNIVERSIDAD POLITECNICA DE MADRID, Madrid (ES)

( * ) Notice: Subject to any disclaimer, the term of this patent is extended or adjusted under 35 U.S.C. 154(b) by 511 days.

(21) Appl. No.: 14/002,858

(22) PCT Filed: Feb. 24, 2012

(86) PCT No.: PCT/ES2012/000044
§ 371 (c)(1),
(2), (4) Date: Sep. 3, 2013

(87) PCT Pub. No.: WO2012/117129
PCT Pub. Date: Sep. 7, 2012

(65) Prior Publication Data
US 2013/0338942 A1    Dec. 19, 2013

(30) Foreign Application Priority Data
Mar. 3, 2011  (ES) .................. 201130287

(51) Int. Cl.
| | |
|---|---|
| *G06F 19/00* | (2011.01) |
| *G01L 5/00* | (2006.01) |
| *B60B 23/06* | (2006.01) |
| *G01L 17/00* | (2006.01) |
| *G01L 5/16* | (2006.01) |

(52) U.S. Cl.
CPC . *G01L 5/00* (2013.01); *B60B 23/06* (2013.01); *G01L 5/16* (2013.01); *G01L 17/005* (2013.01); *B60B 2900/3316* (2013.01)

(58) Field of Classification Search
CPC ... B60T 8/1725; B60T 2240/04; G01M 17/02
USPC ......................... 702/41, 150, 182–185, 188
See application file for complete search history.

(56) References Cited

U.S. PATENT DOCUMENTS

| | | | |
|---|---|---|---|
| 4,448,083 | A | 5/1984 | Hayashi |
| 5,540,108 | A | 7/1996 | Cook |
| 5,894,094 | A | 4/1999 | Kuchler |
| 2001/0054322 | A1 | 12/2001 | Sommerfeld |
| 2004/0162680 | A1 | 8/2004 | Shiraishi |
| 2008/0119978 | A1* | 5/2008 | Stieff ................ G01B 11/2755 701/31.4 |

* cited by examiner

*Primary Examiner* — Edward Raymond
(74) *Attorney, Agent, or Firm* — Lucas & Mercanti, LLP

(57) ABSTRACT

The invention relates to a method for measuring the forces and the moments generated by the tire-road contact from the combination of unit deformation or strain signals measured in different angular and radial positions of the wheel. The angular positions in which the sensors are placed are those permitted by the geometry of the tire. The combination of deformation signals results in six or more signals that are independent of the angular position of the measuring sensors with respect to the tire-road contact point. The effect of temperature and loads that generate deformation signals that do not depend on said angular position of the measuring points, such as centrifugal forces, have been eliminated from the aforementioned signals. Said signals provide estimates of the loads by means of the resolution of two systems of linear equations with constant matrices and three unknowns each.

16 Claims, 10 Drawing Sheets

METHOD AND SYSTEM FOR ESTIMATING THE FORCES AND TORQUES GENERATED BY THE CONTACT OF A TIRE WITH THE ROAD IN AN INSTRUMENTED WHEEL

CROSS-REFERENCE TO RELATED APPLICATIONS

This application is a 371 of PCT/ES2012/000044 filed Feb. 24, 2012, which in turn claims the priority of ES P201130287 filed Mar. 3, 2011, the priority of both applications is hereby claimed and both applications are incorporated by reference herein.

SECTOR OF THE ART

The invention is encompassed within the sector of vehicle dynamics (private cars, trucks, buses, coaches, etc.), and more specifically, it is related to the measurement of the forces and the moments generated at the tire as a consequence of its interaction with the road.

STATE OF THE ART

In order to study the dynamic behavior of a vehicle and determine its features, knowing the forces and the moments acting on the tires as a consequence of their interaction with the road becomes necessary. This is due to the fact that all external forces acting on the vehicle, except for the gravitational and aerodynamic forces, are applied through the tires. We could say that "the critical control forces that determine the way in which the vehicle rotates, brakes, and accelerates are developed in the four or more contact areas".

Mathematical models that represent reality in a simplified manner are used in automobile design. The objective of tire modeling is to find mathematical expressions related to the forces and torques appearing in the tire-road contact with different variables, such as the slip angle, camber angle, slip rate, pressure, travel speed . . . . In order to verify the quality of these formulated mathematical models and verify whether they adjust to reality or not, experimenting with tires becomes necessary.

Tire manufacturers need to compare the forces generated and transmitted by different tire models to determine the best construction for a certain application.

In addition, the design and validation of automobile components require a detailed knowledge of the forces and the moments acting on the tire-road contact, which allows vehicle designers to produce safer and more reliable, efficient, and durable components.

The performance of the control systems of the vehicle can be significantly increased if more detailed information in real time of the forces applied to the tire-road contact could be obtained. On the other hand, the information about the forces and the moments generated at the interface between the tire and the road could be important to understand the causes of accidents.

Currently, there are several methods to measure the forces and the moments generated at the tire-road contact based on the instrumentation of the tire, of the wheel, or of the suspension elements.

The methods based on the instrumentation of the wheel allow measuring the forces and the moments generated at the tire-road contact with greater precision than those based on the instrumentation of the suspension elements, given that the former is closer to the contact area than the latter. In addition, the main application of the systems to measure the forces and the moments generated at the tire-road contact is the assessment of the characteristics of the suspension and its interaction with the chassis of the vehicle. If the forces and the moments are measured with this purpose, the use of measurement methods based on the instrumentation of the suspension elements leads, to a certain extent, to the modification of the elements which characteristics are desired to be assessed. On the other hand, the methods based on the instrumentation of the tire normally require the placement of measurement sensors (accelerometers, optical sensors . . . ) embedded in the interior thereof. They are, therefore, invasive methods in the tire itself that could lead to problems in the assembly of the wheel and produce a greater and irregular wear of the tire. Due to the reasons exposed above, in this invention we propose a method based on the instrumentation of the wheel, and therefore, the review of the state of the art shall be focused on the methods to measure the forces and torques at the tire-road contact wherein the sensors are placed in the wheel.

There are different dynamometric wheel designs that allow measuring the forces and the moments generated at the tire-road contact. Normally, these wheels are formed by a sensor element that replaces the disc of the original wheel of the vehicle. The sensor element is the component of the dynamometric wheel in charge of measuring the three forces and the three moments generated at the tire-road contact, from the deformation measurements taken by a certain number of strain gauges or piezoelectric sensors placed on the same. The sensor element is a standard component, which may be used in different vehicles regardless of the form of the original wheel of the same. In order to be adapted to the tire size of the vehicle and the screw pattern of the wheel, dynamometric wheels are formed by a "modified rim" and a "hub adapter", between which the standard sensor element is placed. After the modified rim and the hub adapter are connected to the sensor element, the dynamometric wheel can be handled as a normal wheel.

In order to measure the forces and the moments generated at the tire-road contact, the original wheels of the vehicle are replaced with the dynamometric wheels described above, which may have different properties than the original wheels, that is to say, they can have different masses, inertias, stiffness . . . and therefore, their dynamic behavior ears be altered.

Instead, the present invention allows the measurement of forces and the moments appearing in the tire-road contact without the need to change the original wheel of the vehicle. Unlike the dynamometric wheels mentioned above, wherein the strain gauges or piezoelectric sensors are placed in a separate element that replaces the wheel disc, in this invention, the original wheel is the one constituting the element wherein the strain gauges are placed. This way, the invention does not have the disadvantages described above, and therefore, the dynamic behavior of the vehicle remains unaltered.

For this reason, the instrumented wheel object of patent application. US 2009/0125251 A1 must be especially mentioned. This wheel allows the measurement of the forces in the hub of the wheel by means of the placement of deformation sensors (such as, for example, strain gauges) in the original wheel of the vehicle. The wheel is instrumented with at least as many strain gauges as forces desired to be determined. The forces are obtained from the deformation components detected by the strain gauges, by applying a characteristic correlation matrix of the instrumented wheel. The appropriate correlation matrix between the forces and the deformation is obtained by means of experimental testing.

However, the instrumented wheel of the aforementioned patent application only allows the measurement of forces but not moments. On the other hand, given a vector of the loads applied on the wheel, the deformation components take on different values when the angular position of the points wherein the sensors are placed varies with respect to the line of application of the loads, that is to say, when the wheel rotates. For this reason, the correlation matrix relates the vector of the forces to be determined with the vector of the deformation components being measured when the sensors are found in a specific angular position. In fact, in the example included in said patent application, the coefficients of the correlation matrix are obtained in order to obtain the forces from the deformation components being measured when the spoke in which each strain gauge is placed, is found in the tire-road contact area.

The fact that the deformation signals measured on the wheel or on the tire vary according to the angular position of the sensors with respect to the line of application of the loads is one of the inconveniences that may be found when it comes to designing a system to measure the forces and the moments appearing at the tire-road contact. Therefore, the deformation signals do not depend only on the forces and the moments desired, to be determined and on other factors such as temperature, centrifugal forces, inflation pressure of the tire . . . but also on the angular position of the measuring points.

Due to the foregoing, in the methods based on the instrumentation of the tire, the following method is frequently applied. In these cases, the deformation signals are only measured when the sensors pass through the same angular position. Based on the deformation signals measured in the specific angular position, the forces and the moments generated at the tire-road contact are determined. The inconvenience of this method is that the frequency with which results of the forces and the moments are obtained is determined by the angular speed of the wheel, which forces the frequency of the sampling to be updated with the change in the angular speed of the same.

Different strategies have been developed to measure the wheel/rail forces in railway vehicles to solve the aforementioned inconvenience, such as, for example, U.S. Pat. No. 5,492,002 or patent application ES 2 334 529 A1.

Both cases propose a measuring method of the forces produced at the wheel/rail contact based on signals that do not depend on the angular position of the sensors with respect to the line of application of the loads. In both methods, the strain gauges are placed in the angular positions that allow, based on the combination of the deformation signals measured by the same, obtaining other signals that are independent from the angular position of the sensors, but do depend on the forces desired to be determined. In the previous patents, for example, pairs of strain gauges are placed at 180° in order to eliminate the even harmonics of the deformation signals and Wheatstone bridges are placed at 90° to eliminate the influence of the angle in the first harmonic of the deformation signal.

However, these strategies, which are valid for trains, cannot be applied directly to car wheels. The strain gauges can rarely be placed in the angular positions required by the previous strategies. While train wheels are usually continuous flange wheels, spoke wheels are very frequent in the case of cars, or wheels perforated with certain patterns in the case of buses and tracks. There is a broad variety of car wheels, each one of which having a different number of spokes and arrangement thereof, and therefore, each one of which allowing the placement of strain gauges only in certain angular positions. For example, the placement of strain gauges at 180°, as proposed by the previous strategies, would be impossible in a wheel with five spokes spaced at 72°. In addition, the forces and the moments intervening in the wheel/rail contact are not of the same type than those intervening in the tire-road contact.

This invention proposes a method that allows obtaining the forces and the moments generated at the tire-road contact by instrumenting the original wheel of the vehicle, due to which its dynamic behavior remains unmodified. These forces and moments are determined by signals that do not depend on the angular position of the sensors. This way, changing the measurement frequency of the forces and the moments with the variation of the angular speed of the wheel is not necessary. These signals are obtained by the combination of the deformation signals measured by the strain gauges placed in the angular positions allowed by the geometry of the wheel. Therefore, it is a flexible method that allows measuring the forces and the moments in wheels with different geometries and number of spokes, given that the strain gauges do not need to be placed in specific angular positions. In addition, the method proposed in this invention allows obtaining, for a certain number of sensors, signals with less ripple than those obtained with the methods developed for train wheels in the aforementioned patents.

BRIEF DESCRIPTION OF THE INVENTION

The present invention allows the measurement of the three components of the force, $F_x$, $F_y$ and $F_z$, and of the three components of moment, $M_x$, $M_y$ and $M_z$ (FIG. 1), which act on the tire as a consequence of its interaction with the road. These forces and moments are obtained from the combination of the deformation signals $\epsilon$, measured at different points of the wheel, which shall be referred to as "measuring points" (reference 1 of FIG. 3-FIG. 7). The sensors—such as, for example, strain gauges—are placed at these measuring points to measure the unit deformation in any desired direction (even in the circumferential direction), even though measuring it in the radial direction is recommended, given that in this case, the signals obtained to estimate the forces and the moments at the tire-road contact have less ripple. For example, in the wheels of FIG. 3 and FIG. 4, the sensors have been placed such that they measure the unit deformation in the radial direction, while in FIG. 5, the unit deformation is measured in the circumferential direction.

The measuring points must be grouped in "measuring circumferences" and "measuring radial lines".

Hereinafter in this document, the set of measuring points found at the same radial distance from the center of the wheel shall be referred to as "measuring circumference" (reference 2 in FIG. 2). The set of measuring points of different measuring circumferences generally placed in the same angular position (reference 3 in the image to the right of FIG. 2) shall be referred to as "measuring radial line". However, if the geometry of the wheel so requires it, the sensors of the same measuring radial line can be placed in different angular positions (reference 3 in the image to the left of FIG. 2).

Within each measuring circumference, the sensors must be placed in equidistant angular positions, as shown in FIG. 3-FIG. 7. In said figures, the "measuring radial lines" are shown with reference 3. In some occasions, due to the geometry of the wheel, the placement of the sensors of different measuring circumferences in the same angular position may not be possible. This last case is shown in FIG. 7, in which in each measuring radial line, the sensors belonging to the two external measuring circumferences are placed at a different angular position than the sensor located in the internal measuring circumference. All of the measuring radial lines used to instrument the wheel must be equal and be separated from one another with identical angular distances, as shown in FIG. 2.

The present invention constitutes a versatile method, which may be used in wheels constituted by spokes or in continuous flange or perforated wheels, as long as the geometry of the wheel allows the instrumentation thereof with at least five equal measuring radial lines in equidistant angular positions. Therefore, the original wheel of the vehicle can be instrumented directly, without modifying its characteristics and without altering its dynamic behavior. The number of sensors to be used depends on the geometry of the wheel and on the precision desired to be obtained in the measurement of the forces and the moments. Five measuring radial lines and three measuring circumferences must be used as a minimum, which supposes a total of 15 sensors. Regardless of the number of sensors used, the present invention allows obtaining six signals, proportional to the forces and torques desired to be measured, at all times.

In short, the object of the present invention is a method to estimate the forces and torques generated by the contact between the tire and the road. In a first step, the deformation signal of a plurality of measuring points in the wheel mounted by the tire is obtained, by means of a plurality of deformation sensors, such as strain gauges, or piezoelectric sensors. The measuring points are distributed by following at least three concentric measuring circumferences with respect to the center of the wheel, with at least five measuring points distributed equidistantly for each measuring circumference. In a second step, the deformation signals are processed as force signals and moment signals generated at the measuring point. The deformation signals of the sensors grouped in the same circumference to decouple the signal resulting from the angular position of the sensors are combined to achieve the foregoing.

Another object of the present invention is to propose a system to estimate the forces and torques generated by the contact of the tire with the road, including a plurality of deformation sensors installed in the wheel mounted by said tire and distributed by following the points located along the length of at least three concentric measuring circumferences with respect to the center of the wheel. The points are distributed equidistantly for each measuring circumference. Said sensors obtain the deformation signal at a plurality of measuring points. The system also includes processing means for the deformation signals as force signals and moment signals generated at each measuring point, which carry out the combination of the deformation signals of the sensors grouped in the same circumference, such that the resulting signal does not depend on the angular position of the sensors.

Figure 1:
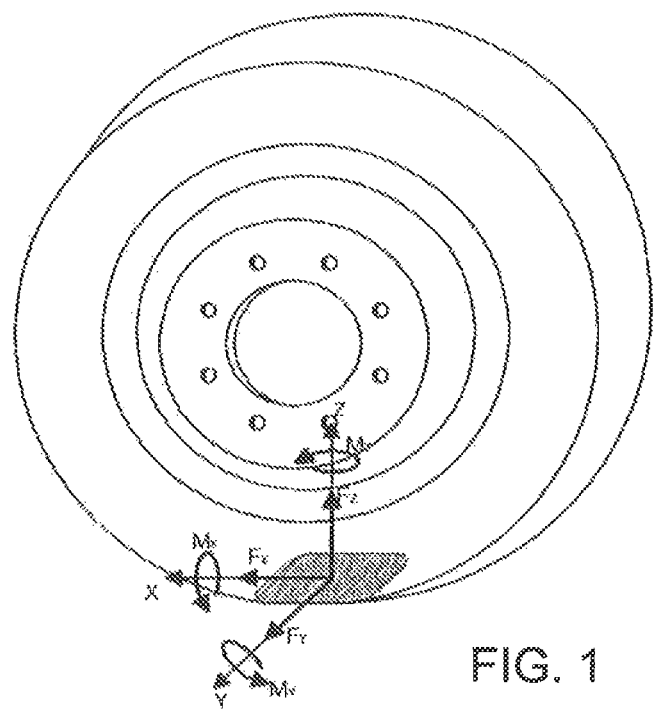
FIG. 1 shows the three components of the force, $F_x$, $F_y$ and $F_z$, and the three components of the moment, $M_x$, $M_y$ and $M_z$ (FIG. 1), which act on the contact area of the tire with the road. These are the forces and the moments intended to be determined with the method proposed in this invention.
Figure 2:
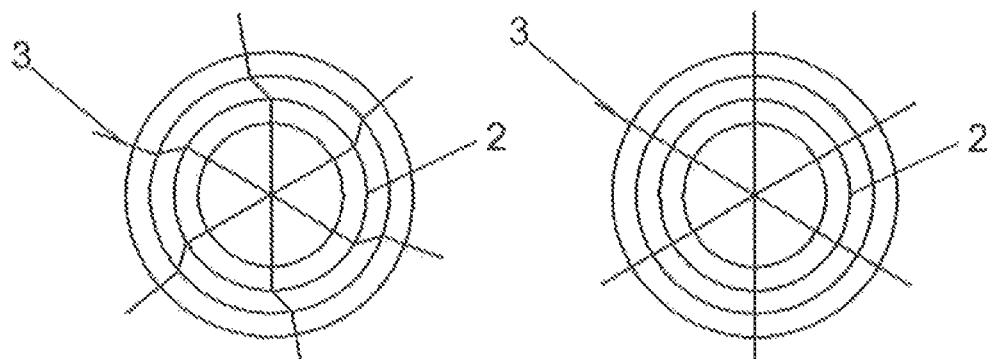

In the images of FIG. 2, four measuring circumferences (2) and six measuring radial lines (3) are shown. The intersection points of the measuring circumferences and the measuring radial lines make up the so-called measuring points. In the image to the right, all the measuring points of the same measuring radial line are in the same angular position. On the other hand, in the image to the left, the measuring points located in the same measuring radial line are not in the same angular position.

Figure 3:
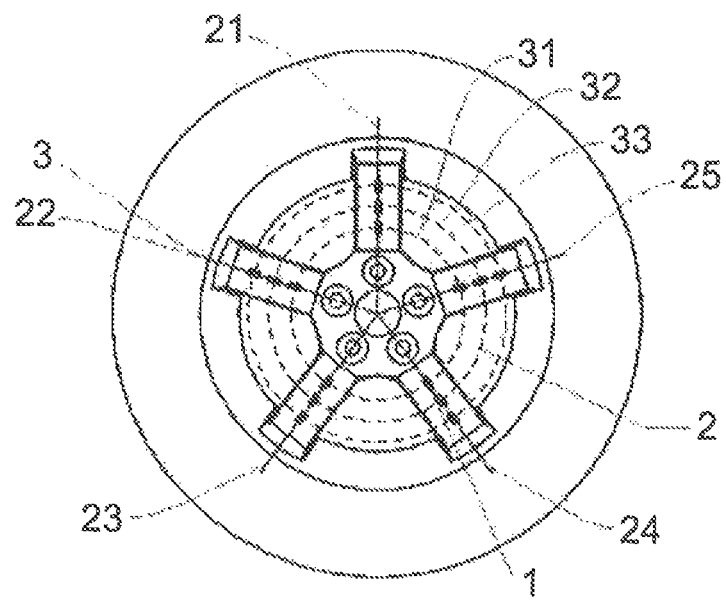

FIG. 3 shows a wheel of a private car with live spokes. The sensors (1) are placed in three measuring circumferences (2). The measuring radial lines (3) are located in the middle line of the spokes of the wheel. Given that the wheel has five spokes, it may be instrumented with five measuring radial lines located in equidistant angular positions at 72°. The sensors measure the unit deformation in the radial direction.

Figure 4:
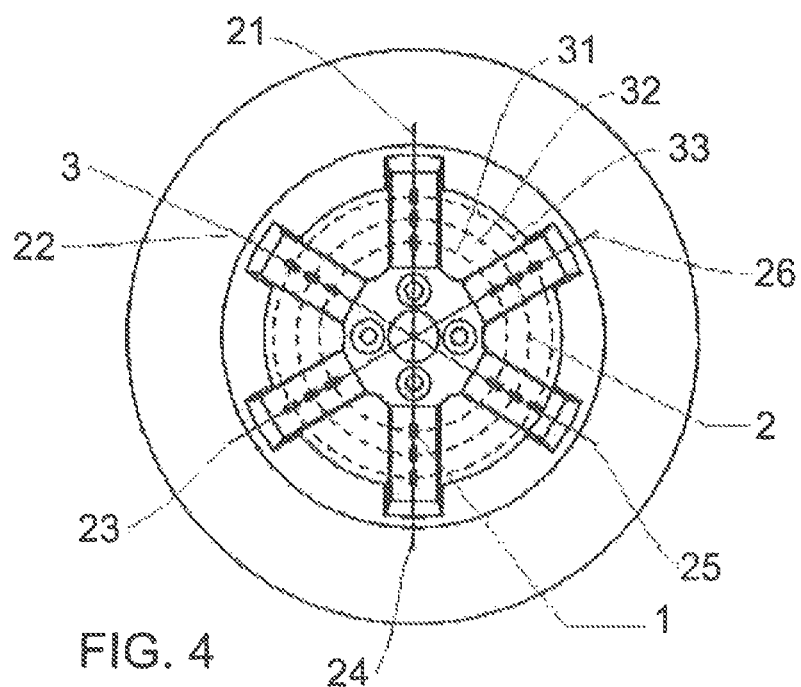

FIG. 4 shows a wheel of a private car with six spokes. The sensors (1) are placed in three measuring circumferences (2). The measuring radial lines (3) are located in the middle line of the spokes of the wheel. Given that the wheel has six spokes, it may be instrumented with six measuring radial lines located in equidistant angular positions at 60°. The sensors measure the unit deformation in the radial direction.

Figure 5:
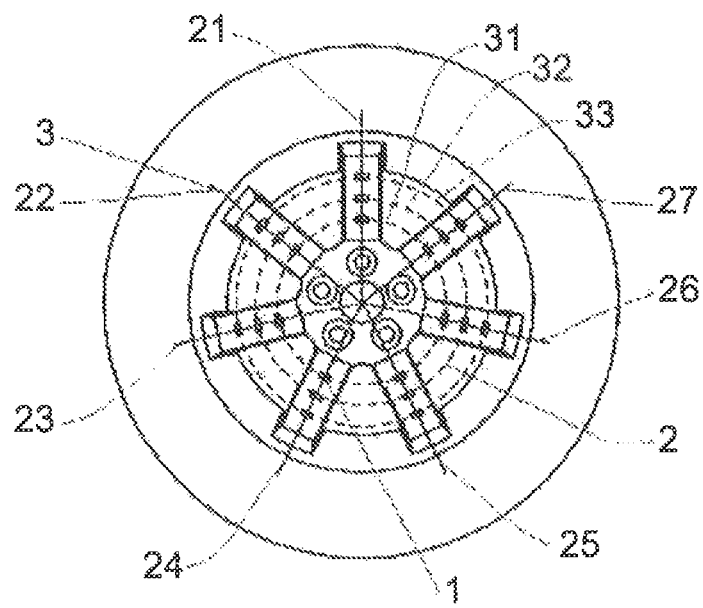

FIG. 5 shows a wheel of a private ear with seven spokes. The sensors (1) are placed in three measuring circumferences (2). The measuring radial lines (3) are located in the middle line of the spokes of the wheel. Given that the wheel has seven spokes, it may be instrumented with seven measuring radial lines located in equidistant angular positions at 51.4285714°. The sensors measure the unit deformation in the circumferential direction.

Figure 6:
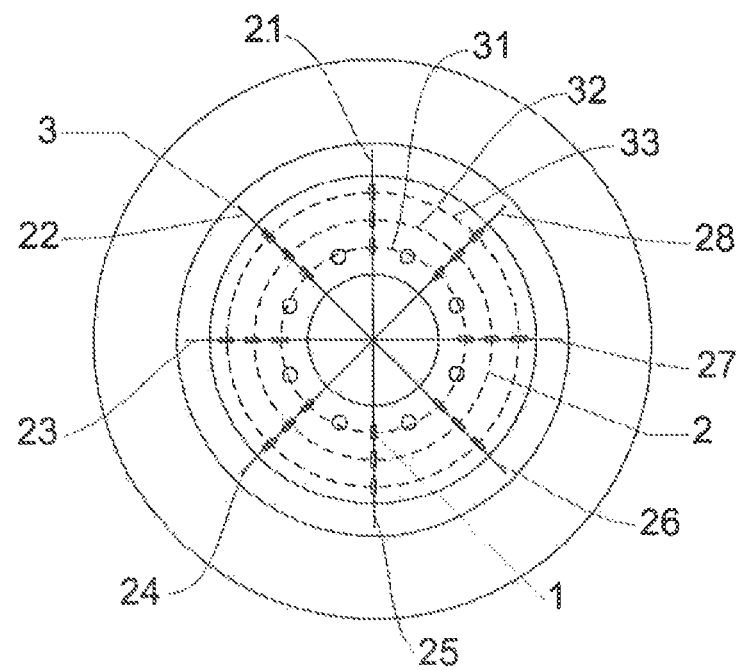

FIG. 6 shows the typical wheel of a truck. The wheel shown in this figure is instrumented with sensors (1) placed in three measuring circumferences (2). Each measuring radial line (3) is placed in the equidistant line of the centers of each pair of holes in the wheel. The measuring radial lines are placed in equidistant angular positions because it is the preferable situation. Given that the wheel is perforated with eight holes, eight sensors can be placed in equidistant angular positions in each measuring circumference. The sensors measure the unit deformation in the radial direction.

Figure 7:
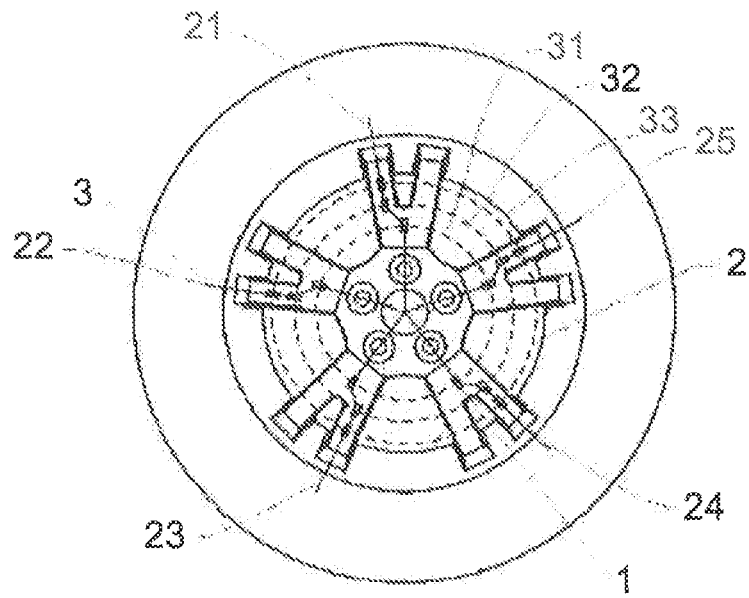

FIG. 7 shows a wheel with five spokes in which, due to its geometry, the radial lines have not been placed in the middle line of the spokes of the wheel. As shown in this FIG., the radial lines have been placed in equidistant angular positions at 72°.

Figure 8:
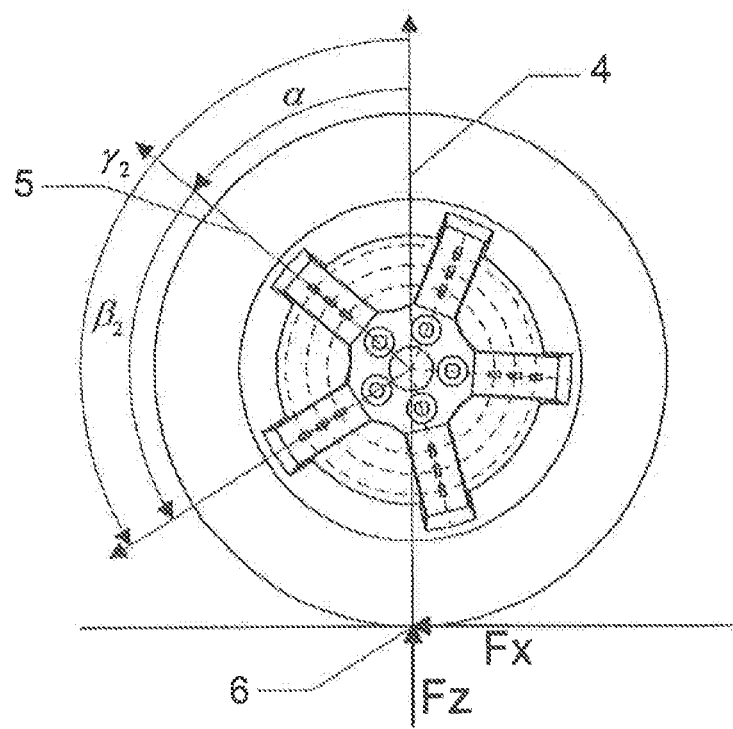

FIG. 8 shows a wheel of a private ear with five spokes after rotating an angle α. This figure shows the line of application of the loads (4) constituting the origin of the angular coordinate α. Likewise, it shows the radial line of reference (5). The angle formed between the radial line of reference (5) and the line of application of the loads (4) is known as α. The angle formed between the measuring radial line j and the radial line of reference (5) is referred to as $\beta_j$. Lastly, the angle between the measuring radial line j and the line of application of the loads (4) is $\gamma_j$. The theoretical contact point (6) is also shown.

Figure 9:
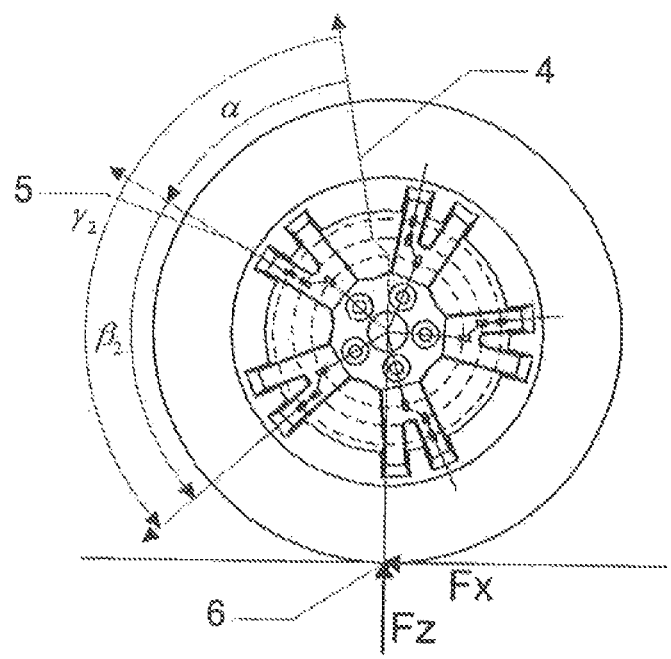

FIG. 9 shows the wheel with five spokes of FIG. 7 after rotating an angle α. This figure shows the line based on which the angular coordinate α (4) is measured. As shown in this FIG., α is equal to the angle formed between one of the measuring points of the radial line of reference (5) and the line of application of the loads. In this case, the measuring point belonging to the first measuring circumference was taken. The angle formed between the measuring radial line j and the radial line of reference (5) is referred to as $\beta_j$. The angle $\gamma_j$ is equal to the sum of α plus $\beta_j$. The theoretical contact point can also be observed.

Figure 10:
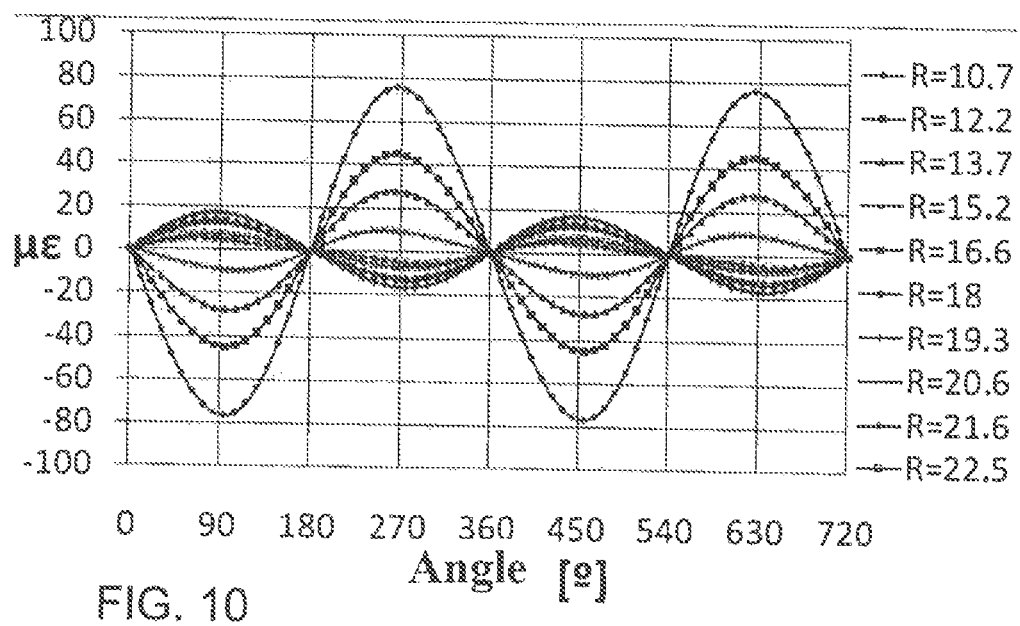

FIG. 10 shows the deformation signals generated at points of the same measuring radial line, located at different radial distances, as the angular position of the measuring radial line varies with respect to the line of application of the loads when a force $F_x$ of 1,000 N is applied to the tire-road contact in the wheel of FIG. 6. The radial distances are expressed in centimeters. The deformation signals were obtained based on a finite element method analysis of the wheel. Therefore, an example of antisymmetrical deformation signals is shown in a wheel of a truck.

Figure 11:
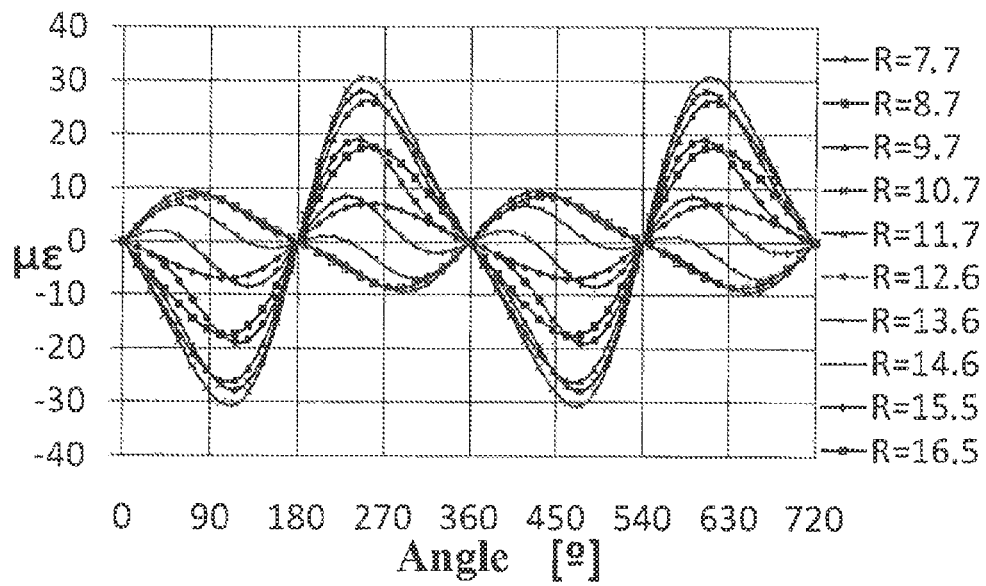

FIG. 11 shows the deformation signals generated at points of the same measuring radial line located at different radial distances, as the angular position of the measuring radial line varies with respect to the line of application of the loads when a force $F_x$ of 1,000 N is applied to the tire-road contact in the wheel of FIG. 3. The radial distances are expressed in centimeters. The deformation signals were obtained based on a finite element method analysis of the wheel. Therefore, an example of antisymmetrical deformation signals is shown in a spoke wheel.

Figure 12:
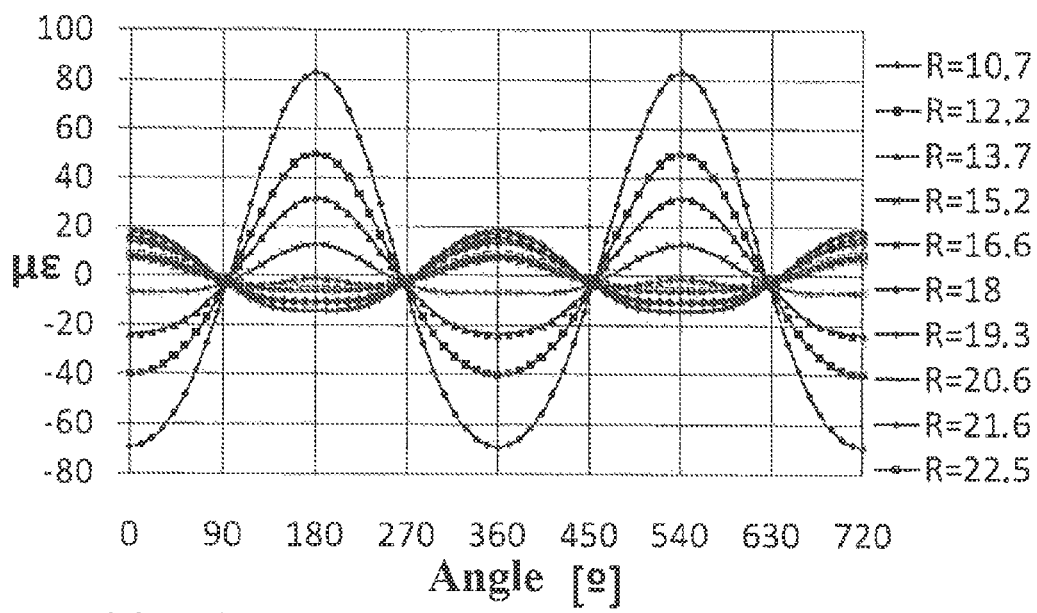

FIG. 12 shows the deformation signals generated at points of the same measuring radial line located at different radial distances, as the angular position of the measuring radial line varies with respect to the line of application, of the loads when a force $F_z$ of 1,000 N is applied to the tire-road contact in the wheel of FIG. 6. The radial distances are expressed in centimeters. The deformation signals were obtained based on a finite element method analysis of the wheel. Therefore, an example of symmetrical deformation signals is shown in a wheel of a truck.

Figure 13:
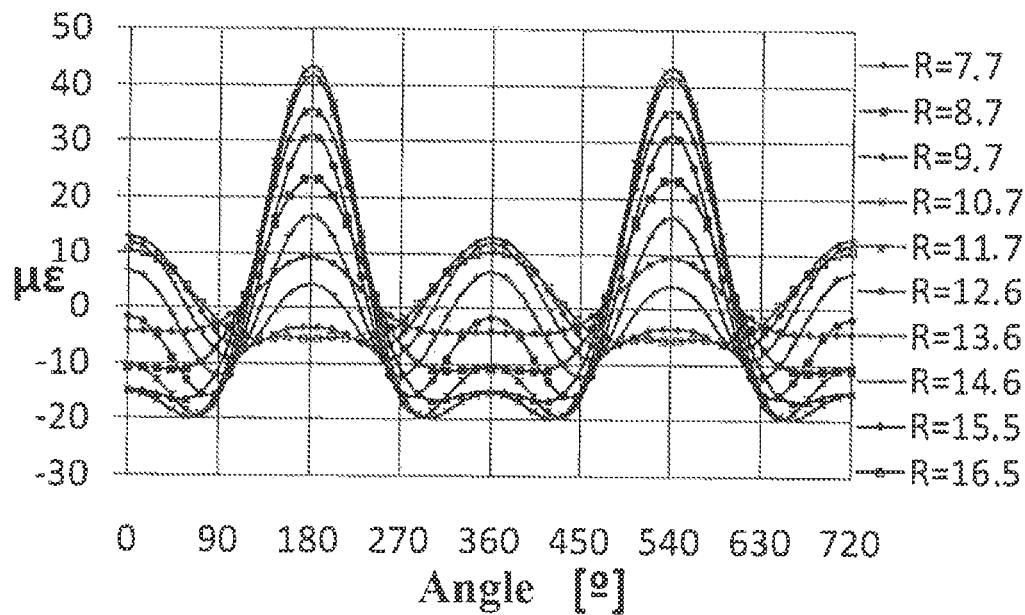

FIG. 13 shows the deformation signals generated at points of the same measuring radial line located at different radial distances, as the angular position of the measuring radial line varies with respect to the line of application of the loads when a force $F_z$ of 1,000 N is applied to the tire-road contact in the wheel of FIG. 3. The radial distances are expressed in centimeters. The deformation signals were obtained based on a finite element method analysis of the wheel. Therefore, an example of symmetrical deformation signals is shown in a spoke wheel.

Figure 14:
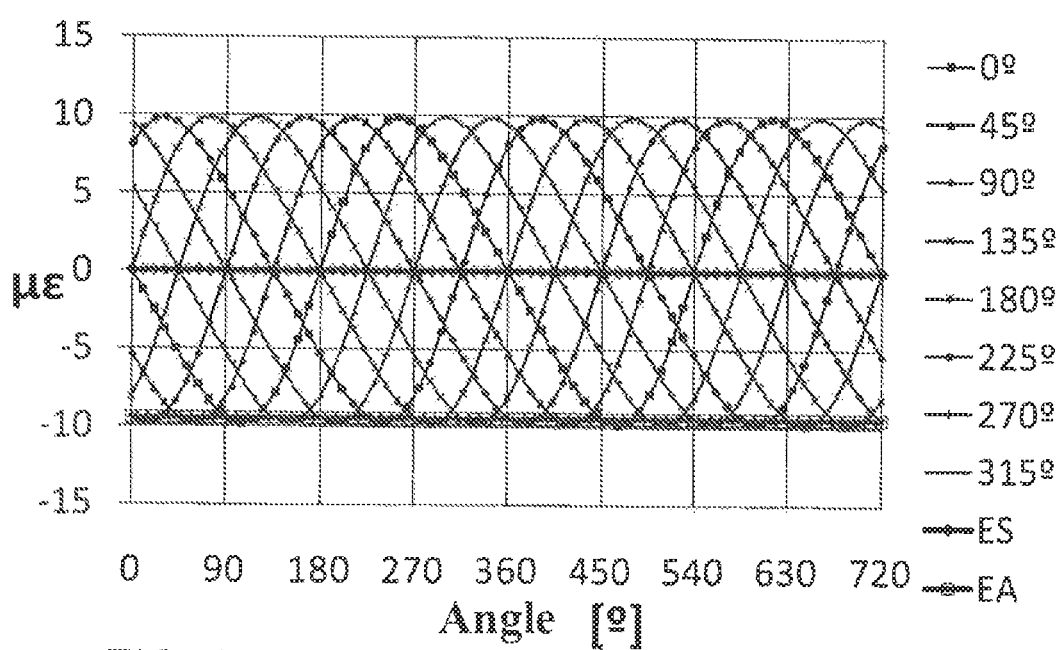

In FIG. 14 the deformation signals generated at points located in different angular positions of the same measuring circumference (at a radial distance of R=15.2 cm) have been represented when a force $F_x$ of 1,000 N is applied to the tire in FIG. 6. The deformation signals were obtained based on a finite element method analysis of the wheel. Likewise, the signals $E_{iS}$ and $E_{iA}$, which are the result of combining the deformation signals of said measuring circumference, respectively, have been represented. Therefore, the figure shows an example in which the signal $E_{iA}$ depends on the loads generating antisymmetrical deformation signals and $E_{iS}$ does not depend on the loads generating antisymmetrical deformation signals.

Figure 15:
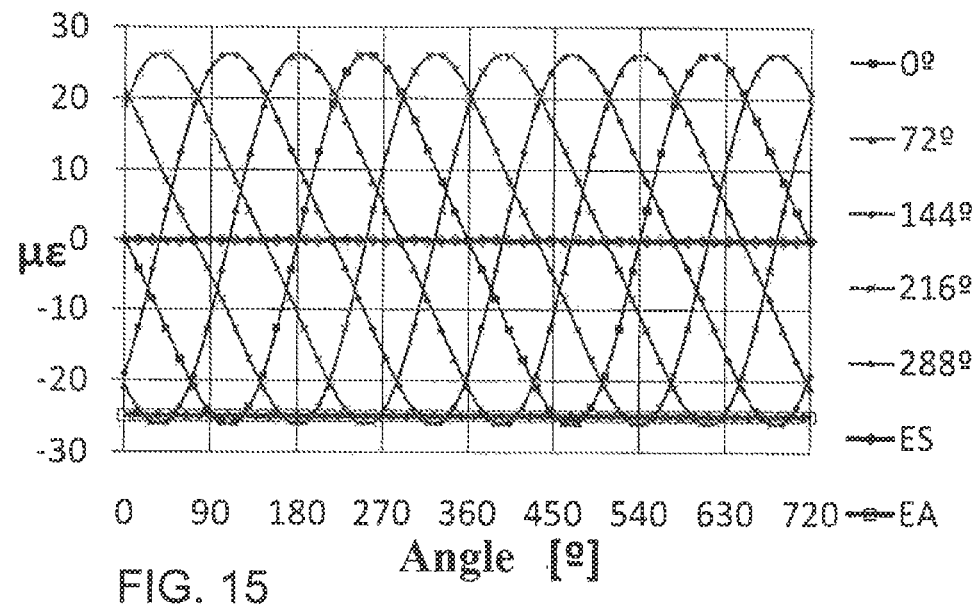

In FIG. 15 the deformation signals generated at points located in different angular positions of the same measuring circumference (at a radial distance of R=10.68 cm) have been represented when a force $F_x$ of 1,000 N is applied to the tire in FIG. 3. The deformation signals were obtained based on a finite element method analysis of the wheel. Likewise, the signals $E_{iS}$ and $E_{iA}$, which are the result of combining the deformation signals of said measuring circumference, respectively, have been represented. Therefore, the figure shows an example in which the signal $E_{iA}$ depends on the loads generating antisymmetrical deformation signals and $E_{iS}$ does not depend on the loads generating antisymmetrical deformation signals.

Figure 16:
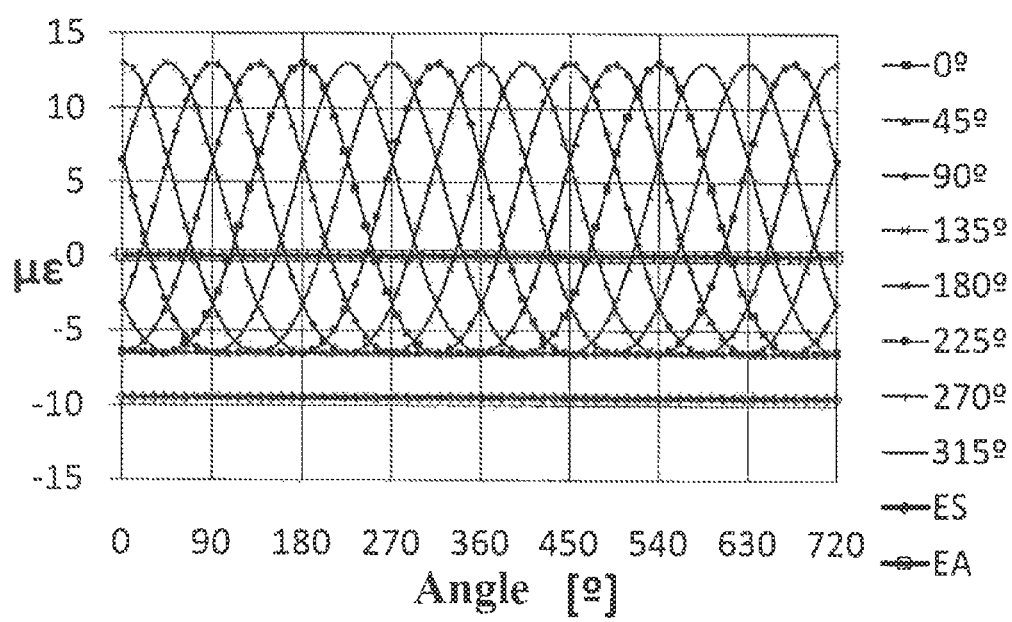

In FIG. 16 the deformation signals generated at points located in different angular positions of the same measuring circumference (at a radial distance of R=15.2 cm) have been represented when a force $F_z$ of 1,000 N is applied to the tire in FIG. 6. The deformation signals were obtained based on a finite element method analysis of the wheel. Likewise, the signals $E_{iS}$ and $E_{iA}$, which are the result of combining the deformation signals of said measuring circumference, respectively, have been represented. Therefore, the figure shows an example in which the signal $E_{iA}$ does not depend on the loads generating symmetrical deformation signals and $E_{iS}$ does depend on the loads generating symmetrical deformation signals.

Figure 17:
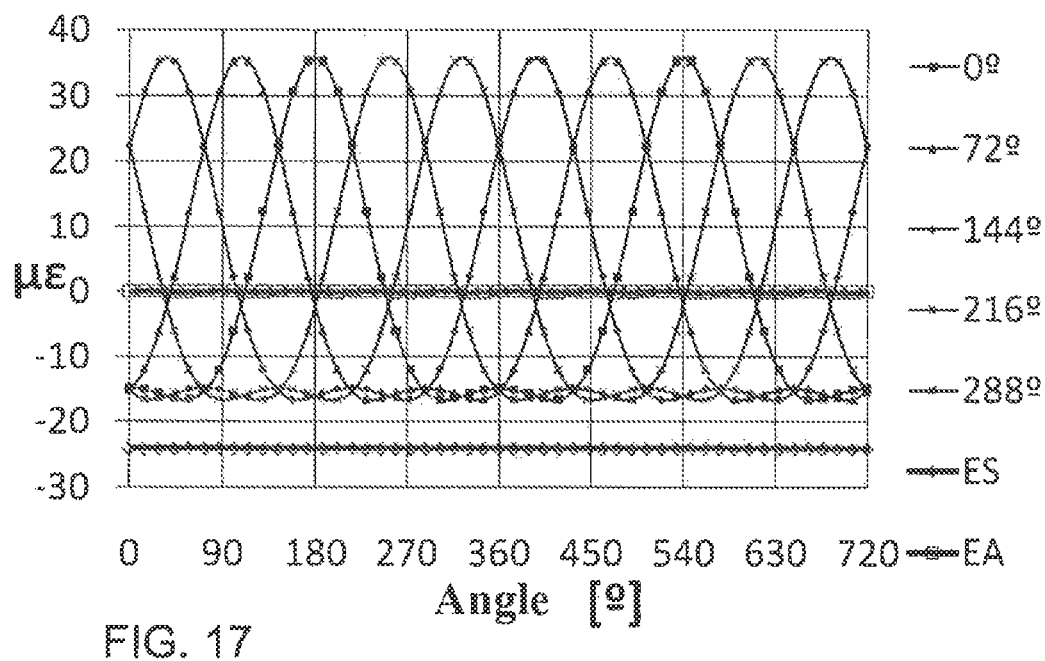

In FIG. 17 the deformation signals generated at points located in different angular positions of the same measuring circumference (at a radial distance of R=10.68 cm) have been represented when a force $F_z$ of 1,000 N is applied to the tire in FIG. 3. The deformation signals were obtained based on a finite element method analysis of the wheel. Likewise, the signals $E_{iS}$ and $E_{iA}$, which are the result of combining the deformation signals of said measuring circumference, respectively, have been represented. Therefore, the figure shows an example in winch the signal $E_{iA}$ does not depend on the loads generating symmetrical deformation signals and $E_{iS}$ does depend on the loads generating symmetrical deformation signals.

Figure 18:
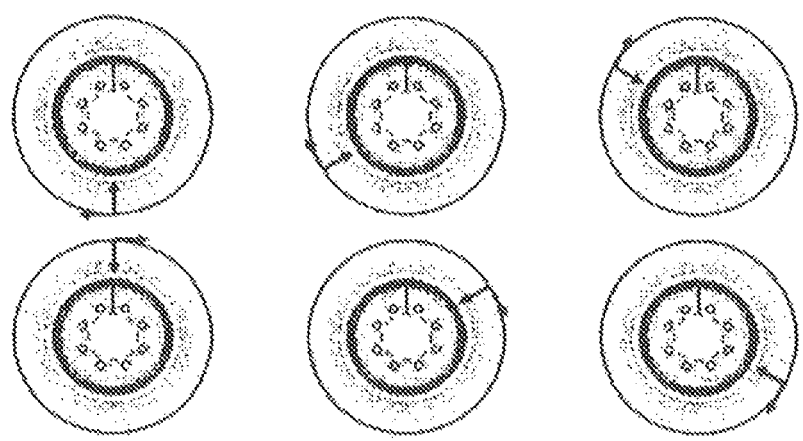

FIG. 18 shows an example of the way in which the loads are applied when the finite element method analysis of the wheel is carried out to determine the position of the measuring circumferences and obtain the coefficients of the sensitivity matrix. The loads are applied on a point basis and by angularly changing the application point.

Figure 19:
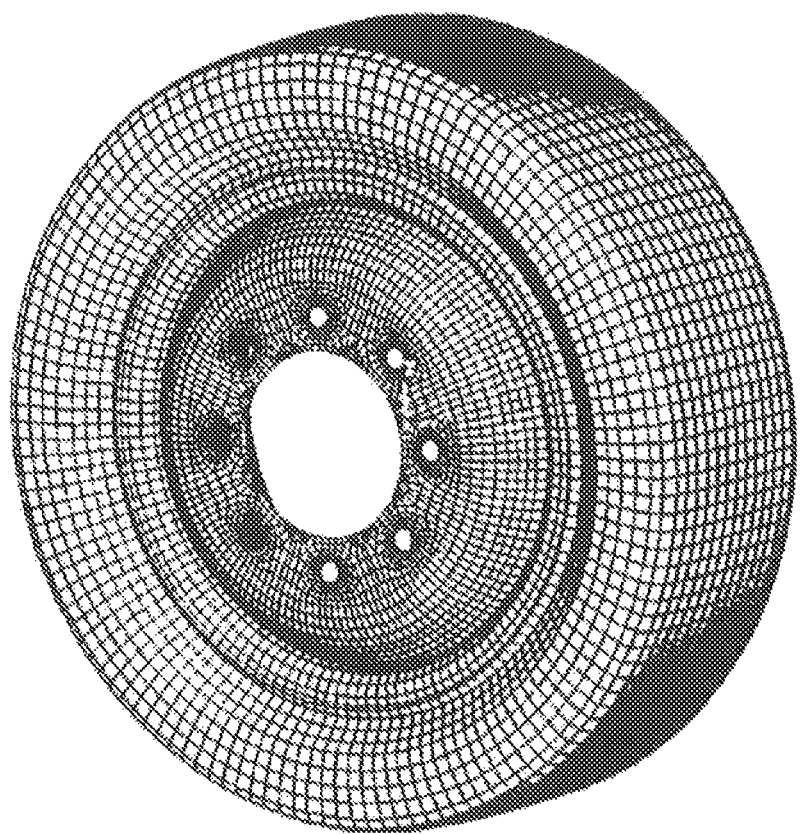

FIG. 19 shows a model of the finite elements of the wheel of FIG. 6.

EXPOSITION OF AN EMBODIMENT OF THE INVENTION

Next, an embodiment of the invention according to the aforementioned characteristics shall be exposed in a non-limitative manner.

The measuring radial lines shall be appropriately defined, for example, in the middle line of the spoke of the wheel (FIG. 3-FIG. 5), or in the line equidistant to the centers of each pair of holes of the wheel, in the case of perforated wheels (FIG. 6). If, due to the geometry of the wheel, the measuring radial lines of the wheel cannot be placed in the middle line, they may be placed in another line thereof, but always in equidistant angular positions and such that, in a certain measuring circumference due to the symmetry of the wheel, the unit deformation in a measuring radial line is equal to the unit deformation in another measuring radial line after the wheel rotates the angle separating the same.

The number of measuring radial lines shall match the number of spokes of the wheel or an exact divisor thereof. If a wheel with five spokes is desired to be instrumented, five sensors shall be placed in each measuring circumference every 72° (five measuring radial lines), as shown in FIG. 3. If the wheel has six spokes, it shall be instrumented with six sensors per measuring circumference every 60° (six measuring radial lines), as shown in FIG. 4, and so on. On the other band, if we have, for example, a wheel with ten spokes, we can choose to place five sensors every 72° (five measuring radial lines) or 10 sensors every 36° (ten measuring radial lines). If the ripple in the signals obtained at each measuring circumference with the use of five strain gauges is acceptable, this option shall be used. On the other hand, if it is not acceptable, the wheel will have to be instrumented with ten measuring radial lines. This ripple, which will be lower the greater the number of measuring radial lines used, can be predicted by means of a finite element method analysis of the wheel.

The most convenient radial distances in which the measuring circumferences are placed (three as a minimum), can also be determined with a finite element method analysis of the wheel desired to be instrumented.

We shall expose the criteria to be used to select the number of measuring radial lines and the method to be followed in order to determine the diameters of the measuring circumferences below.

FIG. 3-FIG. 7 show examples of wheels using between five and eight measuring radial lines (reference 3) and three measuring circumferences (reference 2). In these FIGS., the measuring radial lines have been numbered counterclockwise (31, 32, 33 . . . ) while the measuring circumferences have been numbered from the center towards the exterior of the wheel (21, 22 and 23).

Hereinafter, the subscript i shall refer to the number of the measuring circumference, numbered from the center towards the exterior of the wheel. Subscript j shall refer to the number of the measuring radial line. These measuring radial lines are numbered counterclockwise from a radial line of reference. One of the spokes of the wheel (reference 5 of FIG. 8) is taken as the radial line of reference.

The unit deformation at a point of the wheel located in the measuring circumference i and in the measuring radial line j can be expressed according to equation (1). This equation is a particularization for the case in which the measuring radial lines are straight and pass through the center of the wheel. Supposedly, there is a linear relationship between the forces and the moments generated at the tire-road contact and the unit deformations caused in the wheel.

$$\epsilon_{ij}(\gamma_j,t) = \phi_{ij}^X(\gamma_j) \cdot F_X(t) + \phi_{ij}^Y(\gamma_j) \cdot F_Y(t) + \phi_{ij}^Z(\gamma_j) \cdot F_Z(t) + \\ \Psi_{ij}^X(\gamma_j) \cdot M_X(t) + \Psi_{ij}^Y(\gamma_j) \cdot M_Y(t) + \Psi_{ij}^Z(\gamma_j) \cdot M_Z(t) + \zeta_i(t) \qquad (1)$$

$$\gamma_j = \alpha + \beta_j \qquad (2)$$

where:
- $F_x$, $F_y$ and $F_z$ are the components, in the X, Y, and Z axes, respectively, of the force applied to the tire-road contact. The intersection point between the plane of the wheel (medium plane of the tire perpendicular to its rotation axis) and the projection of its rotation axis over the rolling plane is considered the theoretical contact point (reference 6 of FIG. 9).
- $M_x$, $M_y$ and $M_z$ are the components, in the X, Y, and Z axes, respectively, of the moment applied to the tire-road contact.
- $\epsilon_{ij}$ is the strain (in the radial direction, or in any other direction, as applicable) measured at the point located in the measuring circumference i and in the measuring radial line j.
- $\phi_{ij}^X$, $\phi_{ij}^Y$ and $\phi_{ij}^Z$ are the "influence functions" of the forces $F_x$, $F_y$, and $F_z$ on the strain at the measuring point located in the measuring circumference i and in the measuring radial line j, respectively. Said "influence functions" represent the strain generated at said point when the force under consideration has a unit value and the rest have a null value. They can be determined by means of the finite element method or experimentally.
- $\Psi_{ij}^X$, $\Psi_{ij}^Y$ and $\Psi_{ij}^Z$ are the "influence functions" of the moments $M_x$, $M_y$ and $M_z$ on the strain at the measuring point located in the measuring circumference i and in the measuring radial line j, respectively. Said "influence functions" represent the strain generated at said point when the moment under consideration has a unit value and the rest have a mill value. They can be determined by means of the finite element method or experimentally.
- $\gamma_j = \alpha + \beta_j$ is the angular position of the measuring radial line j with respect to the "line of application of the loads" (reference 4 of FIG. 8). The line of application of the loads is the line connecting the theoretical contact point with the center of the wheel, oriented from said contact point towards the center.
- $\alpha$ is the angular position of the radial line of reference with respect to the line of application of the loads. One of the measuring radial lines (reference 5 of FIG. 8) shall be taken as the radial line of reference. In this case, the radial line referred to as 31 in FIG. 3-FIG. 7 shall be taken as the origin of reference. The radial line of reference rotates at an angular speed equal to the angular speed of wheel, due to which the angular position $\alpha$ varies in time. Basically, it matches the angle rotated by the wheel with respect to its own axis.
- $\beta_j$ is the angular position of the measuring radial line j with respect to the radial line of reference of the angular position. This value is constant and a multiple of 360° divided by the number of measuring radial lines.
- $\zeta_i$ is the strain caused in the measuring circumference i by factors such as temperature, centrifugal forces, pressure . . . which does not vary with the change in the angular position of the measuring point.

Due to the symmetry of the wheel, the influence functions $\phi_{ij}^X$, $\phi_{ij}^Y$ and $\phi_{ij}^Z$, and $\Psi_{ij}^X$, $\Psi_{ij}^Y$ and $\Psi_{ij}^Z$ are periodical functions with respect to the angular position $\gamma_j$, due to which they can be decomposed into Fourier series. Hereinafter, the concepts of "symmetry" and "antisymmetry" will play a fundamental role, due to which we shall begin by defining their meaning. In FIG. 3, the wheel is in a position in which the vertical line passing through the center is a symmetry axis ($\alpha=0$). In this position, the radial lines 32 and 33 are symmetrical with respect to lines 35 and 34. When the geometry presents this type of symmetry, the symmetrical forces or torques ($M_x$, $F_y$, and $F_z$) produce symmetrical deformations (with the same value), while the antisymmetrical forces or torques ($F_x$, $M_y$, and $M_z$) produce antisymmetrical deformations (same absolute value with the opposite sign). For example, when the symmetrical forces or torques $M_x$, $F_y$, and $F_z$ are applied to the tire-road contact, the strains in the points of radial line 2 axe equal to the strains in the same points in radial line 5. In the points of radial line 1, which matches the symmetry axis, the strain can assume a value other than zero. However, when antisymmetrical forces or torques $F_x$, $M_y$, and $M_z$ are applied to the contact point, the strains at the points of radial line 2 will have the same magnitude and the opposite sign than the corresponding strains in the same points in radial line 5. In the points located in radial line 1, the strain must assume a value equal to zero.

The sine and cosine functions are, respectively, symmetrical and antisymmetrical with respect to the origin of the coordinates, which is why they are the ones used to represent the corresponding symmetrical and antisymmetrical terms of the strains. Thus, the decomposition into Fourier series of $\Psi_{ij}^X$, $\phi_{ij}^Y$ and $\phi_{ij}^Z$ only shows cosine terms, given that $M_x$, $F_y$, and $F_z$ generate symmetrical deformation signals (FIG. 12 and FIG. 13), while the decomposition into Fourier series of $\phi_{ij}^X$, $\Psi_{ij}^Y$ and $\Psi_{ij}^Z$ only shows sine terms, given that $F_x$, $M_y$ and $M_z$ generate antisymmetrical deformation signals (FIG. 10 and FIG. 11). Therefore, equation (1) can be rewritten as follows:

$$\varepsilon_{ij}(\gamma_j, t) = M_X(t) \sum_{k=0}^{\infty} \Psi_{ik}^X \cdot \cos(k\gamma_j) + \qquad (3)$$

$$F_X(t) \sum_{k=0}^{\infty} \Phi_{ik}^X \cdot \sin(k\gamma_j) + + F_Y(t) \sum_{k=0}^{\infty} \Phi_{ik}^Y \cdot \cos(k\gamma_j) +$$

$$M_Y(t) \sum_{k=0}^{\infty} \Psi_{ik}^Y \cdot \sin(k\gamma_j) + + F_Z(t) \sum_{k=0}^{\infty} \Phi_{ik}^X \cdot \cos(k\gamma_i) +$$

$$M_Z(t) \sum_{k=0}^{\infty} \Psi_{ik}^X \cdot \sin(k\gamma_l) + + \zeta_i(t)$$

The previous expression shows how the strain measured by a sensor located in the measuring circumference i and in the measuring radial line j varies with the angular position. We can conclude from said expression that the signal measured by the sensor not only depends on the forces and on the moments desired to be measured, but it also depends on the angular position of the sensor with respect to the line of application of the loads and the other factors contained in $\zeta_i$. Therefore, the signals measured by the sensor grouped according to the circumferences and the measuring radial lines described above cannot be directly used to calculate the forces and the moments generated at the tire-road contact; they must be previously treated to avoid the influence of $\gamma_j$ and $\zeta_i$ in the signals used to obtain the forces and the moments.

The present invention is supported in the radial and circumferential distribution of the sensors described above and in an original way of treating the signals of said sensors to obtain six signals independent from the angular position $\gamma_j$ and proportional to the contact forces and torques ($M_x$, $F_y$, $F_z$, $F_x$, $M_y$ and $M_z$) desired to be measured.

Therefore, after their amplification and filtering, the signals of the sensors located in the same measuring circumference are combined with each other, such that signals that only depend on the magnitude of the forces and the moments, but not on the angular position $\gamma_j$ of the wheel, or on other factors such as the temperature or centrifugal forces contained in $\zeta_i$, are obtained. In addition, the fact that there are forces or moments generating symmetrical deformation signals and others generating antisymmetrical deformation signals allow them to be decoupled from one another, and therefore, to reduce the number of sensors to be used.

The signals obtained by combining the strain signals measured by the sensors grouped in the same measuring circumference are the following;

$E_{iS}$: signal that depends linearly on the loads generating symmetrical deformation signals and does not depend on the angular position of the measuring points or on $\zeta_i$ in a significant manner. This signal contains dominant information from the first harmonic of the deformation signals generated by $M_x$, $F_y$ and $F_z$. It must be calculated in at least three measuring circumferences. The number of measuring circumferences in which the signal $E_{iS}$ is calculated shall be referred to as $n_c$, which shall match the number of measuring circumferences with which the wheel is instrumented.

$E_{iA}$: signal that depends linearly on the loads generating antisymmetrical deformation signals and does not depend on the angular position of the measuring points or on $\zeta_i$ in a significant manner. This signal contains dominant information from the first harmonic of the deformation signals generated by $F_x$, $M_y$ and $M_z$. It must be calculated in at least two measuring circumferences. The number of measuring circumferences in which, the signal $E_{iA}$ is calculated shall be referred to as $n_A$.

$E'_{iA}$: signal that depends linearly on the loads generating antisymmetrical deformation signals and does not depend on the angular position of the measuring points or on $\zeta_i$ in a significant manner. This signal contains dominant information from the second harmonic of the deformation signals generated by $F_x$, $M_y$ and $M_z$. This signal is used to obtain a better estimation of the $M_y$ moment, given that, in the deformation signals generated by this moment, the second harmonic is the dominant harmonic, unlike for remaining forces and torques, in which the dominant harmonic in the deformation signals is the first harmonic. It must be calculated in at least one measuring circumferences. The number of measuring circumferences in which the signal $E_{iA}$ is calculated shall be referred to as $n'_A$.

If we consider that the measuring circumference i is instrumented with $n_r$ number of sensors, the deformation signals measured by these sensors must be combined according to equations (4)-(10) shown below, in order to obtain the deformation signals described above. Even though equations (1) and (3) have been particularized for the case in which all the points of the same measuring radial line are in the same angular position (such as in the image to the right of FIG. 2), the signal combinations shown below are equally valid for the case in which all the points of the same measuring radial line are not in the same angular position (such as in the image to the left of FIG. 2). In this last case, the angle formed between any of the measuring points of the radial line of reference and the line of application of the loads shall be taken as the angular position $\alpha$. The definition of the angles $\alpha$, $\beta$ and $\gamma_j$, if all the points of the same measuring radial line are not located in the same angular position, is illustrated in greater detail in FIG. 9.

$$E_{i1} = \frac{2}{n_r} \sum_{j=1}^{n_j} \left( \varepsilon_{ij} \cdot \cos\left((j-1)\frac{2\pi}{n_r}\right) \right) \quad (4)$$

$$E_{i2} = \frac{2}{n_r} \sum_{j=1}^{n_r} \left( \varepsilon_{ij} \cdot \sin\left((j-1)\frac{2\pi}{n_r}\right) \right) \quad (5)$$

$$E'_{i1} = \frac{2}{n_r} \sum_{j=1}^{n_r} \left( \varepsilon_{ij} \cdot \cos\left(2 \cdot (j-1)\frac{2\pi}{n_r}\right) \right) \quad (6)$$

$$E'_{i2} = \frac{2}{n_r} \sum_{j=1}^{n_r} \left( \varepsilon_{ij} \cdot \sin\left(2 \cdot (j-1)\frac{2\pi}{n_r}\right) \right) \quad (7)$$

$$E_{iS}(M_X, F_Y, F_Z) = E_{i1}\cos(\alpha) - E_{i2}\sin(\alpha) \quad (8)$$

$$E_{iA}(F_X, M_Y, M_Z) = E_{i1}\sin(\alpha) + E_{i2}\cos(\alpha) \quad (9)$$

$$E'_{iA}(F_X, M_Y, M_Z) = E'_{i1}\sin(2\alpha) + E'_{i2}\cos(2\alpha) \quad (10)$$

Taking into account equations (4)-(7), the signal combination to be carried out depending on the number of measuring radial lines shall be broken down below. In the following expressions, $\varepsilon_{i1}$ is the deformation measured by the sensor placed in the measuring circumference i and in radial line 1, that is to say, in the hue taken as the radial line of reference of the angular position $\alpha$. Based on this radial fine, the rest have been numbered counterclockwise, as shown in FIG. 3-FIG. 7.

Five Radial Lines:

$$E_{i1} = \frac{2}{5} \cdot \left( \varepsilon_{i1} + \frac{305}{987} \cdot \varepsilon_{i2} - \frac{1292}{1597} \cdot \varepsilon_{i3} - \frac{1292}{1597} \cdot \varepsilon_{i4} + \frac{305}{987} \cdot \varepsilon_{i5} \right) \quad (11)$$

$$E_{i2} = \frac{2}{5} \cdot \left( \frac{855}{899} \cdot \varepsilon_{i2} + \frac{4456}{7581} \cdot \varepsilon_{i3} - \frac{4456}{7581} \cdot \varepsilon_{i4} - \frac{855}{899} \cdot \varepsilon_{i5} \right)$$

$$E'_{i1} = \frac{2}{5} \cdot \left( \varepsilon_{i1} - \frac{1292}{1597} \cdot \varepsilon_{i2} + \frac{305}{987} \cdot \varepsilon_{i3} + \frac{305}{987} \cdot \varepsilon_{i4} - \frac{1292}{1597} \cdot \varepsilon_{i5} \right) \quad (12)$$

$$E'_{i2} = \frac{2}{5} \cdot \left( \frac{4456}{7581} \cdot \varepsilon_{i2} - \frac{855}{899} \cdot \varepsilon_{i3} + \frac{855}{899} \cdot \varepsilon_{i4} - \frac{4456}{7581} \cdot \varepsilon_{i5} \right)$$

Six Radial Lines:

$$E_{i1} = \frac{1}{3} \cdot \left( \varepsilon_{i1} + \frac{1}{2} \cdot \varepsilon_{i2} - \frac{1}{2} \cdot \varepsilon_{i3} - \varepsilon_{i4} - \frac{1}{2} \cdot \varepsilon_{i5} + \frac{1}{2} \cdot \varepsilon_{i6} \right) \quad (13)$$

$$E_{i2} = \frac{1}{3} \cdot \left( \frac{1170}{1351} \cdot \varepsilon_{i2} + \frac{1170}{1351} \cdot \varepsilon_{i3} - \frac{1170}{1351} \cdot \varepsilon_{i5} - \frac{1170}{1351} \cdot \varepsilon_{i6} \right)$$

$$E'_{i1} = \frac{1}{3} \cdot \left( \varepsilon_{i1} - \frac{1}{2} \cdot \varepsilon_{i2} - \frac{1}{2} \cdot \varepsilon_{i3} + \varepsilon_{i4} - \frac{1}{2} \cdot \varepsilon_{i5} - \frac{1}{2} \cdot \varepsilon_{i6} \right) \quad (14)$$

$$E'_{i2} = \frac{1}{3} \cdot \left( \frac{1170}{1351} \cdot \varepsilon_{i2} - \frac{1170}{1351} \cdot \varepsilon_{i3} + \frac{1170}{1351} \cdot \varepsilon_{i5} - \frac{1170}{1351} \cdot \varepsilon_{i6} \right)$$

Seven Radial Lines:

$$E_{i1} = \frac{2}{7} \cdot \left( \varepsilon_{i1} + \frac{929}{1490} \cdot \varepsilon_{i2} - \frac{745}{3348} \cdot \varepsilon_{i3} - \frac{837}{929} \varepsilon_{i4} - \frac{837}{929} \cdot \varepsilon_{i5} - \frac{745}{3348} \cdot \varepsilon_{i6} + \frac{929}{1490} \cdot \varepsilon_{i7} \right) \quad (15)$$

$$E_{i2} = \frac{2}{7} \cdot \left( \frac{1050}{1343} \cdot \varepsilon_{i2} + \frac{1011}{1037} \cdot \varepsilon_{i3} + \frac{3232}{7449} \cdot \varepsilon_{i4} - \frac{3232}{7449} \cdot \varepsilon_{i5} - \frac{1011}{1037} \cdot \varepsilon_{i6} - \frac{1050}{1343} \cdot \varepsilon_{i7} \right)$$

$$E'_{i1} = \frac{2}{7} \cdot \left( \varepsilon_{i1} - \frac{745}{3348} \cdot \varepsilon_{i2} - \frac{837}{929} \cdot \varepsilon_{i3} + \frac{929}{1490} \cdot \varepsilon_{i4} + \frac{929}{1490} \cdot \varepsilon_{i5} - \frac{837}{929} \cdot \varepsilon_{i6} - \frac{745}{3348} \cdot \varepsilon_{i7} \right) \quad (16)$$

$$E'_{i2} = \frac{2}{7} \cdot \left( \frac{1011}{1037} \cdot \varepsilon_{i2} - \frac{3232}{7449} \cdot \varepsilon_{i3} - \frac{1050}{1343} \cdot \varepsilon_{i4} + \frac{1050}{1343} \cdot \varepsilon_{i5} + \frac{3232}{7449} \cdot \varepsilon_{i6} - \frac{1011}{1037} \cdot \varepsilon_{i7} \right)$$

Eight Radial Lines:

$$E_{i1} = \frac{1}{4} \cdot \left( \varepsilon_{i1} + \frac{985}{1393} \cdot \varepsilon_{i2} - \frac{985}{1393} \cdot \varepsilon_{i4} - \varepsilon_{i5} - \frac{985}{1393} \cdot \varepsilon_{i6} + \frac{985}{1393} \cdot \varepsilon_{i8} \right) \quad (17)$$

$$E_{i2} = \frac{1}{4} \cdot \left( \frac{985}{1393} \cdot \varepsilon_{i2} + \varepsilon_{i3} + \frac{985}{1393} \cdot \varepsilon_{i4} - \frac{985}{1393} \cdot \varepsilon_{i6} - \varepsilon_{i7} - \frac{985}{1393} \cdot \varepsilon_{i8} \right)$$

$$E'_{1i} = \frac{1}{4} \cdot (\varepsilon_{i1} - \varepsilon_{i3} + \varepsilon_{i5} - \varepsilon_{i7}) \quad (18)$$

$$E'_{2i} = \frac{1}{4} \cdot (\varepsilon_{i2} - \varepsilon_{i4} + \varepsilon_{i6} - \varepsilon_{i8})$$

Nine Radial Lines:

$$E_{i1} = \frac{2}{9} \cdot \left( \varepsilon_{i1} + \frac{1313}{1714} \cdot \varepsilon_{i2} + \frac{228}{1313} \cdot \varepsilon_{i3} - \frac{1}{2} \cdot \varepsilon_{i4} - \frac{857}{912} \cdot \varepsilon_{i5} - \frac{857}{912} \cdot \varepsilon_{i6} - \frac{1}{2} \cdot \varepsilon_{i7} + \frac{228}{1313} \cdot \varepsilon_{i8} + \frac{1313}{1714} \cdot \varepsilon_{i9} \right) \quad (19)$$

$$E_{i2} = \frac{2}{9} \cdot \left( \frac{664}{1033} \cdot \varepsilon_{i2} + \frac{1102}{1119} \cdot \varepsilon_{i3} + \frac{1170}{1351} \cdot \varepsilon_{i4} + \frac{1903}{5564} \cdot \varepsilon_{i5} - \frac{1903}{5564} \cdot \varepsilon_{i6} - \frac{1170}{1351} \cdot \varepsilon_{i7} - \frac{1102}{1119} \cdot \varepsilon_{i8} - \frac{664}{1033} \cdot \varepsilon_{i9} \right)$$

$$E'_{i1} = \frac{2}{9} \cdot \left( \varepsilon_{i1} + \frac{228}{1313} \cdot \varepsilon_{i2} - \frac{857}{912} \cdot \varepsilon_{i3} - \frac{1}{2} \cdot \varepsilon_{i4} + \frac{1313}{1714} \cdot \varepsilon_{i5} + \frac{1313}{1714} \cdot \varepsilon_{i6} - \frac{1}{2} \cdot \varepsilon_{i7} - \frac{857}{912} \cdot \varepsilon_{i8} + \frac{228}{1313} \cdot \varepsilon_{i9} \right) \quad (20)$$

$$E'_{i2} = \frac{2}{9} \cdot \left( \frac{1102}{1119} \cdot \varepsilon_{i2} + \frac{1903}{5564} \cdot \varepsilon_{i3} - \frac{1170}{1351} \cdot \varepsilon_{i4} - \frac{664}{1033} \cdot \varepsilon_{i5} + \frac{664}{1033} \cdot \varepsilon_{i6} + \frac{1170}{1351} \varepsilon_{i7} - \frac{1903}{5564} \cdot \varepsilon_{i8} - \frac{1102}{1119} \cdot \varepsilon_{i9} \right)$$

Ten Radial Lines:

$$E_{i1} = \frac{1}{5} \cdot \left( \varepsilon_{i1} + \frac{1292}{1597} \cdot \varepsilon_{i2} + \frac{305}{987} \cdot \varepsilon_{i3} - \frac{305}{987} \cdot \varepsilon_{i4} - \frac{1292}{1597} \varepsilon_{i5} - \varepsilon_{i6} - \frac{1292}{1597} \cdot \varepsilon_{i7} - \frac{305}{987} \cdot \varepsilon_{i8} + \frac{305}{987} \cdot \varepsilon_{i9} + \frac{1292}{1597} \cdot \varepsilon_{i10} \right) \quad (21)$$

$$E_{i2} = \frac{1}{5} \cdot \left( \frac{4456}{7581} \cdot \varepsilon_{i2} + \frac{855}{899} \cdot \varepsilon_{i3} + \frac{855}{899} \cdot \varepsilon_{i4} + \frac{4456}{7581} \cdot \varepsilon_{i5} - \frac{4456}{7581} \cdot \varepsilon_{i7} - \frac{855}{899} \varepsilon_{i8} - \frac{855}{899} \varepsilon_{i9} - \frac{4456}{7581} \cdot \varepsilon_{i10} \right)$$

$$E'_{i1} = \frac{1}{5} \cdot \left( \varepsilon_{i1} + \frac{305}{987} \cdot \varepsilon_{i2} - \frac{1292}{1597} \cdot \varepsilon_{i3} - \frac{1292}{1597} \cdot \varepsilon_{i4} + \frac{305}{987} \cdot \varepsilon_{i5} + \varepsilon_{i6} + + \frac{305}{987} \cdot \varepsilon_{i7} - \frac{1292}{1597} \cdot \varepsilon_{i8} - \frac{1292}{1597} \cdot \varepsilon_{i9} + \frac{305}{987} \cdot \varepsilon_{i10} \right) \quad (22)$$

$$E'_{i2} = \frac{1}{5} \cdot \left( \frac{855}{899} \cdot \varepsilon_{i2} + \frac{4456}{7581} \cdot \varepsilon_{i3} - \frac{4456}{7581} \cdot \varepsilon_{i4} - \frac{855}{899} \cdot \varepsilon_{i5} + + \frac{855}{899} \cdot \varepsilon_{i7} + \frac{4456}{7581} \cdot \varepsilon_{i8} - \frac{4456}{7581} \cdot \varepsilon_{i9} - \frac{855}{899} \cdot \varepsilon_{i10} \right)$$

Eleven Radial Lines:

$$E_{i1} = \frac{2}{11} \cdot \left( \varepsilon_{i1} + \frac{832}{989} \cdot \varepsilon_{i2} + \frac{636}{1531} \cdot \varepsilon_{i3} - \frac{1762}{12381} \cdot \varepsilon_{i4} - \frac{869}{1327} \cdot \varepsilon_{i5} - \frac{379}{395} \cdot \varepsilon_{i6} - \frac{379}{395} \cdot \varepsilon_{i7} - \frac{869}{1327} \cdot \varepsilon_{i8} - \frac{1762}{12381} \cdot \varepsilon_{i9} + \frac{636}{1531} \cdot \varepsilon_{i10} + \frac{832}{989} \cdot \varepsilon_{i11} \right) \quad (23)$$

$$E_{i2} = \frac{2}{11} \cdot \left( \frac{439}{812} \cdot \varepsilon_{i2} + \frac{765}{841} \cdot \varepsilon_{i3} + \frac{389}{393} \cdot \varepsilon_{i4} + \frac{953}{1261} \cdot \varepsilon_{i5} + \frac{748}{2655} \cdot \varepsilon_{i6} - \frac{748}{2655} \cdot \varepsilon_{i7} - \frac{953}{1261} \cdot \varepsilon_{i8} - \frac{389}{393} \cdot \varepsilon_{i9} - \frac{756}{841} \cdot \varepsilon_{i10} - \frac{439}{812} \cdot \varepsilon_{i11} \right)$$

$$E'_{i1} = \frac{2}{11} \cdot \left( \varepsilon_{i1} + \frac{636}{1531} \cdot \varepsilon_{i2} - \frac{869}{1327} \cdot \varepsilon_{i3} - \frac{379}{395} \cdot \varepsilon_{i4} - \frac{1762}{12381} \cdot \varepsilon_{i5} + \frac{832}{989} \cdot \varepsilon_{i6} + + \frac{832}{989} \cdot \varepsilon_{i7} - \frac{1762}{12381} \cdot \varepsilon_{i8} - \frac{379}{395} \cdot \varepsilon_{i9} - \frac{869}{1327} \cdot \varepsilon_{i10} + \frac{636}{1531} \cdot \varepsilon_{i11} \right) \quad (24)$$

$$E'_{i2} = \frac{2}{11} \cdot \left( \frac{765}{841} \cdot \varepsilon_{i2} + \frac{953}{1261} \cdot \varepsilon_{i3} - \frac{748}{2566} \cdot \varepsilon_{i4} - \frac{389}{393} \cdot \varepsilon_{i5} - \frac{439}{812} \cdot \varepsilon_{i6} + \frac{439}{812} \cdot \varepsilon_{i7} + \frac{389}{393} \cdot \varepsilon_{i8} + \frac{748}{2655} \cdot \varepsilon_{i9} - \frac{953}{1261} \cdot \varepsilon_{i10} - \frac{765}{841} \cdot \varepsilon_{i11} \right)$$

Twelve Radial Lines:

$$E_{i1} = \frac{1}{6} \cdot \left( \varepsilon_{i1} + \frac{1170}{1351} \cdot \varepsilon_{i2} + \frac{1}{2} \cdot \varepsilon_{i3} - \frac{1}{2} \cdot \varepsilon_{i5} - \frac{1170}{1351} \cdot \varepsilon_{i6} - \varepsilon_{i7} - \frac{1170}{1351} \cdot \varepsilon_{i8} - \frac{1}{2} \cdot \varepsilon_{i9} + \frac{1}{2} \cdot \varepsilon_{i11} + \frac{1170}{1351} \cdot \varepsilon_{i12} \right) \quad (25)$$

$$E_{i2} = \frac{1}{6} \cdot \left( \frac{1}{2} \cdot \varepsilon_{i2} + \frac{1170}{1351} \cdot \varepsilon_{i3} + \varepsilon_{i4} + \frac{1170}{1351} \cdot \varepsilon_{i5} + \frac{1}{2} \cdot \varepsilon_{i6} - \frac{1}{2} \cdot \varepsilon_{i8} - \frac{1170}{1351} \cdot \varepsilon_{i9} - \varepsilon_{i10} - \frac{1170}{1351} \cdot \varepsilon_{i11} - \frac{1}{2} \cdot \varepsilon_{i12} \right)$$

$$E'_{i1} = \frac{1}{6} \cdot \left( \varepsilon_{i1} + \frac{1}{2} \cdot \varepsilon_{i2} - \frac{1}{2} \cdot \varepsilon_{i3} - \varepsilon_{i4} - \frac{1}{2} \cdot \varepsilon_{i5} + \frac{1}{2} \cdot \varepsilon_{i6} + \varepsilon_{i7} + \frac{1}{2} \cdot \varepsilon_{i8} - \frac{1}{2} \cdot \varepsilon_{i9} - \varepsilon_{i10} - \frac{1}{2} \cdot \varepsilon_{i11} + \frac{1}{2} \cdot \varepsilon_{i12} \right) \quad (26)$$

$$E'_{i2} = \frac{1}{6} \cdot \left( \frac{1170}{1351} \cdot \varepsilon_{i2} + \frac{1170}{1351} \cdot \varepsilon_{i3} - \frac{1170}{1351} \cdot \varepsilon_{i5} - \frac{1170}{1351} \cdot \varepsilon_{i6} + \frac{1170}{1351} \cdot \varepsilon_{i8} + \frac{1170}{1351} \cdot \varepsilon_{i9} - \frac{1170}{1351} \cdot \varepsilon_{i11} - \frac{1170}{1351} \cdot \varepsilon_{i12} \right)$$

The signals and $E_{iS}$ and $E_{iA}$ ($i=1, 2, \ldots, n_c$) can be calculated based on the signals $E_{i1}$ and $E_{i2}$ ($i=1, 2, \ldots, n_c$), obtained by means of the combination of the deformation signals measured by the sensors located in the same measuring circumference, by applying equations (8) and (9). Likewise, $E'_{iA}$ ($i=1, 2, \ldots, n_c$) is obtained based on $E'_{i1}$ and $E'_{i2}$ ($i=1, 2, \ldots, n_c$) by applying equation (10).

The signals $E_{i1}$, $E'_{i1}$, and $E_{i2}$ and $E'_{i2}$ ($i=1, 2, \ldots, n_c$) are signals proportional to the three forces and the three moments generated at the tire-road contact.

The proportionality functions relating the forces or torques $F_x$, $M_y$ and $M_z$ with the signal $E_{i1}$ or the signal $E'_{i1}$ are pure sine wave signals (they mainly contain a frequency with little ripple in some superior order harmonics) while the proportionality functions relating the forces or torques $M_x$, $F_y$ and $F_z$ with the signal $E_{i1}$ or the signal $E'_{i1}$ are pure cosine-wave signals. Reciprocally, the proportionality functions relating the forces or torques $F_x$, $M_y$ and $M_z$ with the signal $E_{i2}$ or the signal $E'_{i2}$ are pure cosine waves, and the proportionality functions relating the forces or torques of $M_x$, $F_y$ and $F_z$ with the signal $E_{i2}$ or the signal $E'_{i2}$ are pure sine waves. In the case of the signals $E_{i1}$ and $E_{i2}$, these proportionality functions oscillate with a frequency equal to the rotation frequency of the wheel, while in the case of the signals $E'_{i1}$ and $E'_{i2}$, the frequency at which the proportionality functions oscillate is equal to double the rotation frequency of the wheel. The sought values of the contact forces and torques are obtained from these proportionality ratios.

As deduced from equations (8) to (10), this method implies the measurement of the angular position of the radial line of reference of the wheel $\alpha$.

The signals $E_{iS}$, $E_{iA}$ and $E'_{iA}$ ($i=1, 2, \ldots, n_c$) obtained by means of the previous combinations, are practically constant with respect to the variation of the angular position $\gamma_j$ and do not depend on $\zeta_i$. The signal $E_{iS}$ is a signal proportional to the forces or torques $M_x$, $F_y$ and $F_z$, while the signals $E_{iA}$ and $E'_{iA}$ ($i=1, 2, \ldots, n_c$) are proportional to the forces or torques $F_x$, $M_y$ and $M_z$. In these signals, the proportionality constants do not depend on the angular position of the sensors $\gamma_j$. The reason why these signals do not depend on $\zeta_i$ is because, by making the previous signal combinations, the continuous component of the deformation signals is eliminated. The fact that the combined signals do not depend on the angular position in a significant manner allows the forces and the moments in the tire-road contact to be measured at any moment in time, regardless of the angular position of the sensors with respect to the line of application of the loads.

Therefore, signals $E_{iS}$, $E_{iA}$ and $E'_{iA}$ ($i=1, 2, \ldots, n_c$) that only depend on the forces and the moments desired to be determined are obtained based on the deformation signals and on the angular position of a radial line of reference.

This way, the deformation signals obtained at the points grouped in measuring circumferences and measuring radial lines must be processed to obtain at least six signals proportional to the six forces and torques desired to be determined. Even though carrying out this processing at a control unit located inside of the vehicle is possible, we recommend carrying out said processing in a microcontroller located in the wheel, due to the high amount of deformation signals to be transmitted to the control unit of the vehicle in the opposite case ($n_c \times n_r + 1$ signals). Therefore, we recommend introducing said signals into a microcontroller by means of the corresponding Analog/Digital converter, which must have at least $n_c \times n_r + 1$ channels to process the deformation signals according to the equations (4)-(10). The deformation signals can be obtained by means of an appropriate sensor, such as strain gauges, piezoelectric sensors, . . . , these sensors must admit at least 10,000µε in the positive and negative. The deformation signals are very low level, due to which they need to be amplified.

We recommend the use of linear strain gauges placed in the radial direction. Due to the fact that the unit deformation or strain is desired to be measured, and the temperature compensation is carried out thanks to the signal combination carried out in the microprocessor, each one of the strain gauges can be adapted to a ¼ of a Wheatstone bridge. The output voltage of this Wheatstone bridge is approximately proportional to the unit deformation at the measuring point in which the strain gauge is placed.

As observed above, the measurement of the angular position of the radial line of reference is also necessary. The most appropriate sensors for the measurement of this angular position are "resolvers" and "encoders". The main advantage of encoders is that they offer a digital signal from an analog signal directly, due to which the necessary electronics are simplified.

In order to transmit the signals obtained in the wheel to the control unit located in the vehicle, a telemetry system, or slip ring equipment is required.

The signals $E_{iS}$, $E_{iA}$ and $E'_{iA}$ ($i=1, 2, \ldots, n_c$) resulting from the previous combinations can be expressed with close approximation as follows:

$$E_{iS} \approx \Psi_{i1}^X \cdot M_X(t) + \Phi_{i1}^Y \cdot F_Y(t) + \Phi_{i1}^Z \cdot F_Z(t) \tag{27}$$

$$E_{iA} \approx \Phi_{i1}^X \cdot F_X(t) + \Psi_{i1}^Y \cdot M_Y(t) + \Psi_{i1}^Z \cdot M_Z(t) \tag{28}$$

$$E'_{iA} \approx \Phi_{i2}^X \cdot F_X(t) + \Psi_{i2}^Y \cdot M_Y(t) + \Psi_{i2}^Z \cdot M_Z(t) \tag{29}$$

As stated above, the signals $E_{iS}$, $E_{iA}$ and $E'_{iA}$ ($i=1, 2, \ldots, n_c$) are not exactly constant with the variation of the angular position of the measuring points, but they have a slight ripple that is negligible for a number of measuring radial lines that is higher than or equal to five. This ripple is due to the fact that, with the combination of the previous signals, all of the harmonics other than the first cannot be eliminated from the deformation signals. Due to this last reason, this method for measuring the forces and the moments generated at the tire-road contact can only be used in the following assumptions:

The values of $\Psi^X_{i(nr-1)}$, $\Phi^Y_{i(nr-1)}$ and $\Phi^Z_{i(nr-1)}$ are negligible with respect to the values of $\Psi^X_{i1}$, $\Phi^Y_{i1}$ and $\Phi^Z_{i1}$.

The values of $\Phi^X_{i(nr-1)}$, $\Psi^Y_{i(nr-1)}$ and $\Psi^Z_{i(nr-1)}$ are negligible with respect to the values of $\Phi^X_{i1}$, $\Psi^Y_{i1}$ and $\Psi^Z_{i1}$.

The values of $\Phi^X_{i(nr-2)}$, $\Psi^Y_{i(nr-2)}$ and $\Psi^Z_{i(nr-2)}$ are negligible with respect to the values of $\Phi^X_{i2}$, $\Psi^Y_{i2}$ and $\Psi^Z_{i2}$.

If the previous conditions are not met, the ripple in the signals $E_{iS}$, $E_{iA}$ and $E'_{iA}$ ($i=1, 2, \ldots, n_c$) will be too important and the dependency on the angular position of said signals would not be eliminated.

Therefore, the previous criteria shall be the one used to determine the number of measuring radial lines to be used if the geometry of the wheel allows it to be instrumented with a different number of measuring radial lines. For example, as said above, a wheel with ten spokes can be instrumented with five or ten measuring radial lines. If the use of five measuring radial lines is enough to meet the previous conditions, the wheel may be instrumented with this number of measuring radial lines, thus reducing the number of sensors to be used. If, on the contrary, said conditions are not met, the fulfillment of the same if ten measuring radial lines are used would have to be verified. The amplitudes of the harmonics of the influence functions can be predicted by means of a finite element method analysis of the wheel or verified experimentally if the wheel is already instrumented. Verifying that the amplitude of the non-eliminated harmonics is negligible in comparison with the amplitude of the first and second harmonics of the influence functions, either by means of a finite element method analysis or by experimental measurements, is essential to select the number of measuring radial lines to be used (which must be an exact divisor of the number of spokes of the wheel) and to verify the success of the measurement method. The method to obtain the same shall be exposed below.

The forces and the moments are calculated based on the signals $E_{iS}$, $E_{iA}$ and $E'_{iA}$ ($i=1, 2, \ldots, n_c$), by solving two systems of linear equations. The coefficient matrices of these systems of linear equations are characteristics of the wheel to be instrumented, that is to say, the coefficients to be used are different for every wheel type. These coefficients also depend on the diameters of the measuring circumferences.

In the general case in which tic measuring circumferences are used, where $n_c \geq 3$ and where signal $E_{iS}$ is obtained in all of them, in $n_A \geq 2$ of the previous measuring circumferences the signal $E_{iA}$ is obtained, and in $n'_A \geq 1$ measuring circumferences the signal $E'_{iA}$ is calculated, the problem Is reduced to the resolution of the following systems of linear equations:

$$\begin{bmatrix} \Psi_{11}^X & \Phi_{11}^Y & \Phi_{11}^Z \\ \Psi_{21}^X & \Phi_{21}^Y & \Phi_{21}^Z \\ \vdots & \vdots & \vdots \\ \Psi_{n_c 1}^X & \Phi_{n_c 1}^Y & \Phi_{n_c 1}^Z \end{bmatrix} \begin{Bmatrix} M_X(t) \\ F_Y(t) \\ F_Z(t) \end{Bmatrix} = \begin{Bmatrix} E_{1S} \\ E_{2S} \\ \vdots \\ E_{n_c S} \end{Bmatrix}; \quad (30)$$

$$\begin{bmatrix} \Phi_{11}^X & \Psi_{11}^Y & \Psi_{11}^Z \\ \vdots & \vdots & \vdots \\ \Phi_{n_A 1}^X & \Psi_{n_A 1}^Y & \Psi_{n_A 1}^Z \\ \Phi_{12}^X & \Psi_{12}^Y & \Psi_{12}^Z \\ \vdots & \vdots & \vdots \\ \Phi_{n'_A 2}^X & \Psi_{n'_A 2}^Y & \Psi_{n'_A 2}^Z \end{bmatrix} \begin{Bmatrix} F_X(t) \\ M_Y(t) \\ M_Z(t) \end{Bmatrix} = \begin{Bmatrix} E_{1A} \\ \vdots \\ E_{n_A A} \\ E'_{1A} \\ \vdots \\ E'_{n'_A A} \end{Bmatrix}$$

The resolution of the two previous systems of linear equations shall be carried out in a microcontroller located in the wheel or in a control unit located in the vehicle, by means of the use of an appropriate mathematical method.

In principle, using three measuring circumferences would be enough to determine the three forces and the three moments generated at the tire-road contact. However, if greater precision is desired in the measurement of the forces and torques, more than three measuring circumferences can be used and two over-determined equation systems, as the ones expressed in (30), can be solved.

The coefficients of the previous matrices (which are constant for a certain wheel with certain sensors) can be found experimentally or by means of a finite element method analysis of the wheels. The appropriate diameter of the measuring circumferences is also determined from this analysis.

In order to calculate these coefficients, the strains in the different radial positions of the wheel when forces and moments are applied to each one of the three axis separately must be calculated. Given that the contact area and the pressure distribution are unknown a priori, the loads can be applied as if they were point-based, taking the Saint Venant principle into account (at a certain distance from the section where a force system is acting, the distribution of tension is practically independent from the distribution of the force system, as long as its resulting force and resulting moment are equal).

For example, in order to calculate the coefficient $\Phi^X_{i1}$ in the measuring circumference i, a force must be applied in the X axis (the remaining forces and moments are equal to zero) and the strain must be calculated in the points of the wheel located in the different measuring radial lines and in the measuring circumference i when the radial line of reference is found at 0° of the line of application of the loads ($\alpha=0$).

Then, the force is applied in application points located in different angular positions, as shown in FIG. 18, and the strain is obtained in the same measuring points than in the previous case. By varying the application point of the force and maintaining the position of the measuring point, we are able to obtain the way in which the deformation signal varies when the angular position of the measuring points changes with respect to the application point of the force, that is to say, as $\alpha$ varies. After having the values of the deformation signal produced by a force in the X axis for a 360° interval, equations (4), (5) and (9) are applied to the measuring points belonging to the measuring circumference i for each $\alpha$ value for which the strain was obtained. In other words, the theoretical value of the signal $E_{iA}$ in the measuring circumference i would be obtained for each $\alpha$ value when only a force $F_x$ is applied to the contact. This signal is practically constant with the angular position $\alpha$, as shown in FIG. 14 and FIG. 15, and is proportional to the force applied in the X axis. The average value of the signal $E_{iA}$, divided by the magnitude of the load applied, results in the coefficient $\Phi^X_{i1}$.

The procedure followed to calculate $\Phi^X_{i1}$ must be repeated with the rest of the forces and moments to obtain the other coefficients in each possible measuring circumference, by changing the calculation of the signal $E_{iA}$ to $E_{iS}$ or to $E'_{iA}$ depending on the coefficient desired to be obtained. This way, the signal $E_{iA}$ must be calculated to obtain coefficients $\Phi^X_{i1}$, $\Psi^Y_{i1}$ and $\Psi^Z_{i1}$, the signal $E_{iS}$ must be calculated to obtain coefficients $\Psi^X_{i1}$, $\Phi^Y_{i1}$ and $\Phi^Z_{i1}$, and the signal $E'_{iA}$ must be calculated to obtain coefficients $\Phi^X_{i2}$, $\Psi^Y_{i2}$ and $\Psi^Z_{i2}$.

The matrix (31), referred to as the "sensitivity matrix", is built from the calculated coefficients for each possible combination of three measuring circumferences (or more if greater precision is desired when obtaining the forces and the moments), and its numerical conditioning is calculated. The measuring circumferences resulting in a sensitivity matrix with a good numerical conditioning are selected, and the coefficients corresponding to this sensitivity matrix shall be the ones used to calculate the forces and the moments in the tire-road contact. Therefore, the sensors with which the wheel will be instrumented must be placed in the radial positions of the measuring circumferences selected according to the aforementioned criteria.

$$\begin{bmatrix} \Psi_{11}^X & \Phi_{11}^Y & \Phi_{11}^Z & 0 & 0 & 0 \\ \Psi_{21}^X & \Phi_{21}^Y & \Phi_{21}^Z & 0 & 0 & 0 \\ \vdots & \vdots & \vdots & \vdots & \vdots & \vdots \\ \Psi_{n_c 1}^X & \Phi_{n_c 1}^Y & \Phi_{n_c 1}^Z & 0 & 0 & 0 \\ \hline 0 & 0 & 0 & \Phi_{11}^X & \Psi_{11}^Y & \Psi_{11}^Z \\ \vdots & \vdots & \vdots & \vdots & \vdots & \vdots \\ 0 & 0 & 0 & \Phi_{n_A 1}^X & \Psi_{n_A 1}^Y & \Psi_{n_A 1}^2 \\ 0 & 0 & 0 & \Phi_{12}^X & \Psi_{12}^Y & \Psi_{12}^Z \\ \vdots & \vdots & \vdots & \vdots & \vdots & \vdots \\ 0 & 0 & 0 & \Phi_{n'_A 2}^X & \Psi_{n'_A 2}^Y & \Psi_{n'_A 2}^Z \end{bmatrix} \quad (31)$$

The coefficients calculated according to the previous procedure can be adjusted experimentally.

Particular Case

The explanation provided above will be applied to a 250/61 321 truck wheel, as the one shown in FIG. 6. Said wheel has a tire of the radial-ply type. The carcass is formed by a canvas which cables are oriented radially between the beads, that is to say, with a 90° angle. On the other hand, the belt is formed by two textile layers, which strings are arranged at ±20° angles.

The first step to be undertaken is a finite element model of the wheel, as shown in FIG. 19. The tire of the truck wheel has been meshed with eight-nodes hexahedrons with three degrees of freedom each. This tire has 23,960 elements and 29,920 nodes, and therefore, it has 89,760 degrees of freedom. On the other hand, the wheel has been meshed with shell-type elements with four nodes and six degrees of freedom each. The wheel is formed, by 6,913 elements and 7,128 nodes, due to which it has 42,768 degrees of freedom. Therefore, the model has a total of 132,528 degrees of freedom. In order to make the model of the tire, the Mooney-Rivlin formulation has been used to model the behavior of the rubber compounds, the follower forces for the inflation pressure, and reinforcement elements interact with the structural elements, known as base elements, through the matching nodes for the belt and carcass.

Point forces and moments have been applied to the finite element model made by changing the angular position of the application point of the forces and the moments as shown in FIG. 18. Forces of 1 kN and moments of 1 kN·cm have been applied separately, that is to say, by maintaining the rest of the forces and moments equal to zero, and the radial strain caused by these forces and moments in the same measuring radial line but at different radial positions has been calculated, as the angular position of the measuring points changes with respect to the line of application of the loads.

Based on the previous data, deformation signals at different radial distances, such as the ones shown in FIG. 10 and FIG. 12, have been generated.

The amplitude of the first harmonic of the deformation signal has been calculated for each load and radial distance, and it has been divided by the magnitude of the applied load, thus determining the coefficients $\Phi^X_{i1}$, $\Phi^Y_{i1}$, $\Phi^Z_{i1}$ $\Psi^X_{i1}$, $\Psi^Y_{i1}$ and $\Psi^Z_{i1}$ for each possible radial distance in which a measuring circumference can be placed. The coefficients $\Phi^X_{i2}$, $\Psi^Y_{i2}$, $\Psi^Z_{i2}$ have been similarly obtained.

We only used three measuring circumferences in this example, due to which the matrix (31) has been built for every possible combination of three different radial positions of the measuring circumferences, and the numerical conditioning of said matrix has been calculated to determine the radial distances in which said circumferences would be placed. The measuring circumferences with which a matrix (31) with the best possible numerical conditioning can be obtained were selected as the radial positions in which the measuring circumferences have been placed. These radial positions, $d_{ci}$, for this specific example, are the following:

$d_{c1} = 20.6$ cm $d_{c2} = 10.7$ cm $d_{c3} = 24.9$ cm

With the coefficients obtained from the finite element method analysis of this wheel, for the radial positions in which the selected measuring circumferences are placed, the equation systems to be solved to obtain the forces and the moments can be obtained. For this wheel, and for the radial positions of the selected measuring circumferences, the systems of linear equations to be solved are the following:

$$\begin{bmatrix} -10.07356 & -43.41659 & 16.30315 \\ 49.79912 & 213.71008 & -76.01822 \\ 8.40449 & 36.50730 & -6.74541 \end{bmatrix} \cdot 10^{-3} \begin{Bmatrix} M_X(t) \\ F_Y(t) \\ F_Z(t) \end{Bmatrix} = \begin{Bmatrix} E_{1S} \\ E_{2S} \\ E_{3S} \end{Bmatrix} \quad (32)$$

$$\begin{bmatrix} -76.00678 & -0.38532 & 0.01689 \\ -6.68250 & -0.08614 & 0.02700 \\ 841.62589 & 824.39191 & 824.39191 \end{bmatrix} \cdot 10^{-3} \begin{Bmatrix} F_X(t) \\ M_Y(t) \\ M_Z(t) \end{Bmatrix} = \begin{Bmatrix} E_{2A} \\ E_{3A} \\ E'_{1A} \end{Bmatrix} \quad (33)$$

Therefore, we already know the positions in which the measuring circumferences are placed. Due to the geometrical shape of tire wheel of FIG. 6, eight strain gauges can be placed in equidistant angular positions at 45° in each measuring circumference. For this reason, this wheel has been instrumented with eight measuring radial lines, as shown in said figure. Therefore, this wheel has 24 strain gauges in total.

The signals coming from these strain gauges, which still depend on the rotation of the wheel, must be combined with each other by applying equations (17), (18), (8), (9) and (10) to eliminate this dependency. This way, the signals $E_{1S}$, $E_{2S}$ and $E_{3S}$ of equation system (32) are obtained by applying the equations (17) and (8) to the sensors placed at radial distances of 20.6 cm, 10.7 cm and 24.9 cm, respectively. The signals $E_{2A}$ and $E_{2A}$ of equation system (33) are obtained by combining the signals of the sensors placed at the radial distances of 10.7 cm and 24.9 cm, respectively, according to equations (17) and (9). The signal $E'_{1A}$ appearing in equation system (33) is obtained by combining the signals of the sensors placed at a radial distance of 10.7 cm according to equations (18) and (10).

This combination can be carried out in a microcontroller located in the wheel itself. Likewise, the signals coming from the strain bridges can be sent via telemetry to the control unit located in the vehicle. Measuring the angular position α of a radial line of reference with respect to the line of application of the loads is necessary to carry out the combination of signals, due to which an appropriate sensor, such as an encoder or a resolver, must be used. After carrying out this combination of signals, $E_{1S}$ only depends on the forces or moments generating symmetrical deformation signals, while $E_{iA}$ and $E'_{1A}$ only depend on the forces or moments generating antisymmetrical deformation signals (FIG. 14 and FIG. 16).

Therefore, the forces and moments can be measured in a continuous manner, independently from the angular position of the wheel, by solving equation, systems (32) and (33).

The invention claimed is:

1. Method for estimating the forces and torques generated by the contact of the tire with the road comprising:
    obtaining deformation signals in a plurality of measuring points of a wheel having a tire mounted thereon by means of a plurality of deformation sensors;
    processing the deformation signals as force signals and as moment signals generated at the measuring point;
    wherein the measuring points are distributed by following at least three concentric measuring circumferences with respect to the center of the wheel, with at least five measuring points distributed equidistantly for each measuring circumference;
    and the processing of the signals comprises a combination of the deformation signals of the sensors grouped in the same circumference to decouple the signal resulting from the angular position of the sensors.

2. Method according to claim 1, wherein the deformation signals are decomposed in three perpendicular axes, the X axis being the movement direction axis, the Z axis being the direction axis perpendicular to the contact surface, and the Y axis being the direction axis perpendicular to the surface of the wheel.

3. Method according to claim 2, wherein the deformation signals are combined in such a way that the symmetrical components according to the X direction of the moment $M_x$, and according to the Y and Z direction of the forces $F_y$ and $F_z$, do not depend on the antisymmetrical components according to the X direction of the Force $F_x$ and according to the Y and Z directions of the moments $M_y$ and $M_z$ in a substantial manner.

4. Method according to claim 3, wherein the combined deformation signals comprise a first resulting signal, $E_{iS}$, which depends on the symmetrical components of the measuring circumference (i), with information from the first harmonic.

5. Method according to claim 4, wherein the first resulting signal $E_{iS}$ is calculated for at least three measuring circumferences.

6. Method according to claim 3, wherein the combined signals comprise a second resulting signal, $E_{iA}$, which depends on the antisymmetrical components of the measuring circumference (i), with information from the first harmonic.

7. Method according to claim 6, wherein the second resulting signal $E_{iA}$ is calculated for at least two measuring circumferences.

8. Method according to claim 3, wherein the combined signals comprise a third resulting signal, $E'_{iA}$, which depends on the antisymmetrical components of the measuring circumference (i), with information from the second harmonic.

9. Method according to claim 8, wherein the resulting signal $E'_{iA}$ is calculated for at least one measuring circumference.

10. Method according to claim 1, further comprising modeling the wheel and the tire to obtain a coefficient matrix related to the amplitude of the harmonics of the influence functions, where the influence functions present the unit deformation or strain generated at said point when the force or torque under consideration has a unit value and the rest have a null value.

11. Method according to claim 1, wherein the deformation sensors are placed in the radial direction.

12. Method according to claim 1, wherein the deformation sensors are strain gauges.

13. System for estimating the forces and the torques generated by the contact of a tire with the road that comprises:
a plurality of deformation sensors installed in the wheel having the tire mounted thereon, said sensors being configured to obtain the deformation signal in a plurality of measuring points,
processing means of the deformation signals as force signals and as moment signals generated at each measuring point,
wherein the deformation sensors are distributed by following measuring points along the length of at least three concentric measuring circumferences with respect to the center of the wheel and with at least five measuring points distributed equidistantly for each measuring circumference;
and the processing means of the signals are configured to combine the deformation signals of the sensors grouped in the same circumference such that the resulting signal does not depend on the angular position of the sensors.

14. System according to claim 13, wherein it comprises the wheel where the plurality of sensors is installed.

15. System according to claim 13, wherein the deformation sensors are placed in the radial direction.

16. System according claim 13, wherein the deformation sensors are strain gauges.

* * * * *